US012445772B2

(12) United States Patent
Tsuji et al.

(10) Patent No.: US 12,445,772 B2
(45) Date of Patent: Oct. 14, 2025

(54) ACOUSTIC PROCESSING DEVICE, METHOD, AND PROGRAM

(71) Applicant: Sony Group Corporation, Tokyo (JP)

(72) Inventors: Minoru Tsuji, Chiba (JP); Toru Chinen, Kanagawa (JP)

(73) Assignee: Sony Group Corporation, Tokyo (JP)

( * ) Notice: Subject to any disclaimer, the term of this patent is extended or adjusted under 35 U.S.C. 154(b) by 164 days.

(21) Appl. No.: 18/023,882

(22) PCT Filed: Aug. 27, 2021

(86) PCT No.: PCT/JP2021/031449
§ 371 (c)(1),
(2) Date: Feb. 28, 2023

(87) PCT Pub. No.: WO2022/054602
PCT Pub. Date: Mar. 17, 2022

(65) Prior Publication Data

US 2023/0336913 A1 Oct. 19, 2023

(30) Foreign Application Priority Data

Sep. 9, 2020 (JP) ................................. 2020-151446

(51) Int. Cl.
*H04S 7/00* (2006.01)
*H04R 3/00* (2006.01)
*H04R 29/00* (2006.01)

(52) U.S. Cl.
CPC ........... *H04R 3/005* (2013.01); *H04R 29/002* (2013.01); *H04S 7/302* (2013.01); *H04S 7/307* (2013.01); *H04R 2430/20* (2013.01)

(58) Field of Classification Search
CPC .... H04R 3/12; H04R 3/14; H04S 7/00; H04S 7/302; H04S 7/308; H04S 2420/07
See application file for complete search history.

(56) References Cited

U.S. PATENT DOCUMENTS

2011/0116641 A1 5/2011 Bergere
2016/0066118 A1 3/2016 Oh et al.
(Continued)

FOREIGN PATENT DOCUMENTS

JP 2009-077379 A 4/2009
JP 2011-529658 A 12/2011
(Continued)

OTHER PUBLICATIONS

International Written Opinion and English translation thereof mailed Nov. 16, 2021 in connection with International Application No. PCT/JP2021/031449.

(Continued)

*Primary Examiner* — James K Mooney
(74) *Attorney, Agent, or Firm* — Wolf, Greenfield & Sacks, P.C.

(57) ABSTRACT

The present technology relates to an acoustic processing device, method, and program capable of performing audio replaying with higher sound quality. An acoustic processing device includes: a first rendering processing unit that performs rendering processing on the basis of an audio signal and generates a first output audio signal for outputting sound from a plurality of first speakers; and a second rendering processing unit that performs rendering processing on the basis of an audio signal and generates a second output audio signal for outputting sound from a plurality of second speakers having a different replaying band from that of the first speakers. The present technology can be applied to an audio replaying system.

16 Claims, 14 Drawing Sheets

(56) References Cited

U.S. PATENT DOCUMENTS

| | | | | |
|---|---|---|---|---|
| 2017/0048640 | A1 | 2/2017 | Dressler et al. | |
| 2019/0253825 | A1 | 8/2019 | Tsuji | |
| 2021/0345060 | A1* | 11/2021 | Robinson ................ | H04S 7/307 |

FOREIGN PATENT DOCUMENTS

| | | | |
|---|---|---|---|
| JP | 2018-527825 | A | 9/2018 |
| WO | WO-2020081674 | A1 | 4/2020 |

OTHER PUBLICATIONS

International Preliminary Report on Patentability and English translation thereof mailed Mar. 23, 2023 in connection with International Application No. PCT/JP2021/031449.

Extended European Search Report issued Feb. 2, 2024 in connection with European Application No. 21866561.0.

International Search Report and English translation thereof mailed Nov. 16, 2021 in connection with International Application No. PCT/JP2021/031449.

[No Author Listed], Information technology—High efficiency coding and media delivery in heterogeneous environments—Part 3: 3D audio. International Standard ISO/IEC DIS 23008-3. Jul. 25, 2014; ver. 2.1c2; 433 pages.

Pulkki V., Virtual Sound Source Positioning Using Vector Base Amplitude Panning. Journal of the Audio Engineering Society. Jun. 1, 1997;45(6):456-66.

* cited by examiner

ACOUSTIC PROCESSING DEVICE, METHOD, AND PROGRAM

CROSS-REFERENCE TO RELATED APPLICATIONS

This application claims the benefit under 35 U.S.C. § 371 as a U.S. National Stage Entry of International Application No. PCT/JP2021/031449, filed in the Japanese Patent Office as a Receiving Office on Aug. 27, 2021, which claims priority to Japanese Patent Application Number JP2020-151446, filed in the Japanese Patent Office on Sep. 9, 2020, each of which is hereby incorporated by reference in its entirety.

TECHNICAL FIELD

The present technology relates to an acoustic processing device, method, and program, and particularly to an acoustic processing device, method, and program capable of performing audio replaying with higher sound quality.

BACKGROUND ART

In recent years, object-based audio technologies have attracted attention.

In object-based audio, audio data is configured of a waveform signal (audio signal) for an object and meta data indicating localization information indicating a relative position of the object seen from a viewing point (listening position) that is a predetermined reference. Also, the waveform signal is rendered to a desired channel number through vector based amplitude panning (VBAP), for example, on the basis of the meta data and is then replayed (see NPL 1 and NPL 2, for example).

CITATION LIST

Non Patent Literature

NPL 1

ISO/IEC 23008-3 Information technology—High efficiency coding and media delivery in heterogeneous environments—Part 3: 3D audio [NPL 2]

Ville Pulkki, "Virtual Sound Source Positioning Using Vector Base Amplitude Panning", Journal of AES, vol. 45, no. 6, pp. 456 to 466, 1997

SUMMARY

Technical Problem

Incidentally, in a case where object rendering replaying is performed in a speaker layout in which a plurality of speakers are arranged in a three-dimensional space, many speakers are used, and a case where all the speakers do not have the same replaying band is conceivable.

For example, in-vehicle audio is a use case in which many speakers can be arranged. In-vehicle audio is typically configured of a speaker layout in which a speaker having a low replaying band and called a woofer, a speaker having a middle replaying band and called a squawker, and a speaker having a high replaying band and called a tweeter are present together.

However, in a case where rendering such as VBAP of object audio is performed in such a speaker layout, replaying bands of the speakers used for the replaying differ depending on the localization position of the object.

Therefore, degradation of sound quality such as disappearing of sound may occur depending on the frequency band of sound of the object and the localization position, for example, in a case where sound of the object including only high-frequency components is replayed by the woofer located in the vicinity of the localization position of the object.

The present technology was made in view of such circumstances, and an object thereof is to enable audio replaying with higher sound quality.

Solution to Problem

An acoustic processing device according an aspect of the present technology includes: a first rendering processing unit that performs rendering processing on the basis of an audio signal and generates a first output audio signal for outputting sound from a plurality of first speakers; and a second rendering processing unit that performs rendering processing on the basis of the audio signal and generates a second output audio signal for outputting sound from a plurality of second speakers having a different replaying band from that of the first speakers.

An acoustic processing method or a program according to an aspect of the present technology includes the steps of: performing rendering processing on the basis of an audio signal and generating a first output audio signal for outputting sound from a plurality of first speakers; and performing rendering processing on the basis of the audio signal and generating a second output audio signal for outputting sound from a plurality of second speakers having a different replaying band from that of the first speakers.

According to an aspect of the present technology, the rendering processing is performed on the basis of the audio signal, the first output audio signal for outputting sound from the plurality of first speakers is thereby generated, the rendering processing is performed on the basis of the audio signal, and the second output audio signal for outputting sound from the plurality of second speakers having a different replaying band from that of the first speakers is thereby generated.

DESCRIPTION OF EMBODIMENTS

Hereinafter, embodiments to which the present technology is applied will be described with reference to the drawings.

First Embodiment

<Concerning Present Technology>

The present technology is adopted to perform audio replaying with higher sound quality by performing rendering processing for each speaker layout including speakers having the same replaying band in a case where object-based audio is replayed by a speaker system including speakers that have a plurality of mutually different replaying bands.

Figure 1:
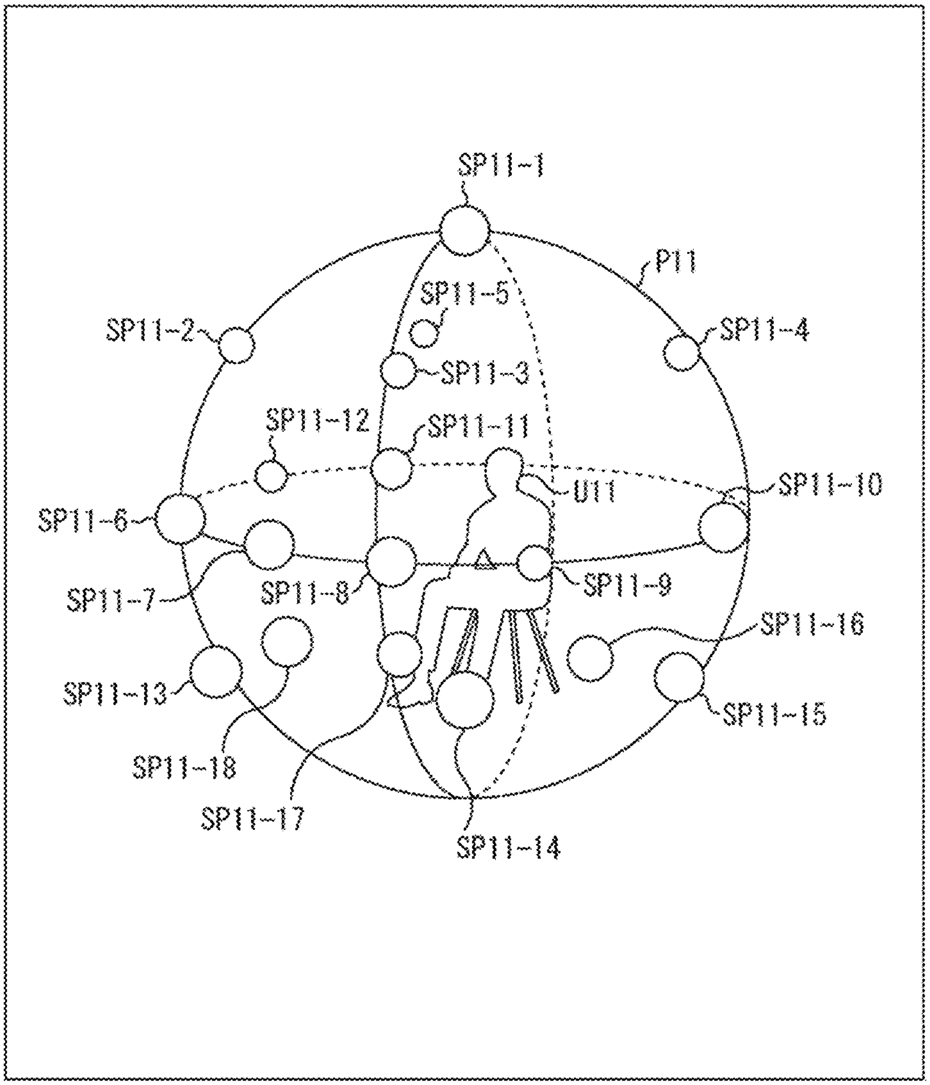
FIG. 1 is a diagram for explaining the present technology.

For example, according to the present technology, a plurality of speakers SP11-1 to SP11-18 are arranged on a surface of a sphere P11 around a user U11 who is a listener of object-based audio such that the speakers SP11-1 to SP11-18 surround the user U11 as illustrated in FIG. 1.

Also, object-based audio is replayed by using the speaker system including the speakers SP11-1 to SP11-18.

Note that in a case where it is not particularly necessary to distinguish the speakers SP11-1 to SP11-18, the speakers SP11-1 to SP11-18 will simply be referred to as speakers SP11.

In this example, since the plurality of speakers SP11 include speakers having mutually different replaying bands, rendering processing is performed for each replaying band.

For example, a speaker group (group) including the speakers SP11 having the same replaying band, more specifically, three-dimensional arrangement of each speaker SP11 constituting the speaker group, will be referred to as one speaker layout.

At this time, rendering processing is performed for each speaker layout constituting the speaker system, and speaker replaying signals for replaying sound of an object (audio object) in the speaker layout are generated.

Note that the rendering processing may be any processing such as VBAP or panning.

Once the rendering processing is performed on one speaker layout, a speaker replaying signal of each speaker SP11 in the speaker layout is generated.

In a case where VBAP is performed as the rendering processing, one or a plurality of meshes are formed on the surface of the sphere P11 by all the speakers SP11 configuring the speaker layout.

A triangular region surrounded by three speakers SP11 constituting the speaker layout on the surface of the sphere P11 is one mesh.

It is now assumed that VBAP of a predetermined speaker layout is performed in regard to one object.

Also, it is assumed that object data of the object is supplied and the object data includes an object signal that is an audio signal for replaying sound of the object and meta data that is information regarding the object.

The meta data includes at least the position of the object, that is, position information indicating the sound image localization position of sound of the object.

The position information of the object is, for example, coordinate information indicating the relative position of the object seen from the position of the head of the user U11 at a listening position that is a predetermined reference. In other words, the position information is information indicating the relative position of the object with reference to the head position of the user U11.

In VBAP, one mesh including the position indicated by the position information of the object (hereinafter, also referred to as an object position) is selected from meshes formed by the speakers SP11 in the speaker layout. Here, the mesh that has been selected will be referred to as a selected mesh.

Next, a VBAP gain is obtained for each speaker SP11 on the basis of the positional relationship between the arrangement position of each speaker SP11 constituting the selected mesh and the object position, gain adjustment of the object signal is performed using the VBAP gain, and a speaker replaying signal is thereby obtained.

In other words, the signal obtained by performing gain adjustment on the object signal on the basis of the VBAP gain obtained for the speaker SP11 is the speaker replaying signal for the speaker SP11. Note that the speaker replaying signals of the speakers SP11 other than the speakers SP11 constituting the selected mesh from among all the speakers SP11 in the speaker layout are zero signals. In other words, the VBAP gain for the speakers SP11 other than the speakers SP11 constituting the selected mesh is zero.

If sound is output from these speakers SP11 on the basis of the thus obtained speaker replaying signal of each speaker SP11 in the speaker layout, the sound of the object is replayed such that a sound image is localized at the object position indicated by the position information.

Additionally, it is also possible to generate the speaker replaying signal of each speaker SP11 in the speaker layout by using panning, for example.

In such a case, a gain of each of the speakers SP11 is obtained on the basis of the positional relationship between each speaker SP11 in the speaker layout and the object in each direction, such as the front-back direction, the left-right direction, and the up-down direction in the drawing, for example. Then, gain adjustment of the object signal is performed using the obtained gain for each speaker SP11, and the speaker replaying signal of each speaker SP11 is generated.

In this manner, the rendering processing for each speaker layout may be any processing such as VBAP or panning, and a case where VBAP is performed as the rendering processing will be described below.

In the speaker system, the rendering processing is performed for each of a plurality of speaker layouts constituting the speaker system and having mutually different replaying bands, and speaker replaying signals of all the speakers SP11 constituting the speaker system are generated. In other words, a plurality of speaker layout configurations are prepared for each replaying band, and the rendering processing is performed for each replaying band.

According to the present technology, it is thus possible to curb degradation of sound quality due to the replaying bands of the speakers SP11 and to perform audio replaying with higher sound quality even in a case where the speakers SP11 having mutually different replaying bands are present together.

For example, it is assumed that meshes are formed by all the speakers SP11 constituting the speaker system and VBAP is performed as the rendering processing.

At this time, if it is assumed that there is an object position in a mesh formed by the speaker SP11-1, the speaker SP11-2, and the speaker SP11-5, for example, the speaker SP11-1, the speaker SP11-2, and the speaker SP11-5 replay sound of the object.

In this case, if it is assumed that the sound of the object includes only high-frequency components, and the speaker SP11-1, the speaker SP11-2, and the speaker SP11-5 are speakers having low replaying bands, for example, it is not possible to replay the sound of the object with a sufficient sound pressure by these speakers SP11. Thus, degradation of sound quality may occur, and for example, the volume of the sound of the object decreases, and the sound cannot be listened to.

On the other hand, according to the present technology, the rendering processing is performed for each of the plurality of replaying bands, and the replaying of components in each frequency band is thus always performed by the speakers SP11 having the replaying bands including the frequency band. Therefore, it is possible to curb degradation of sound quality due to the replaying bands of the speakers SP11 and to perform audio replaying with higher sound quality.

Note that, according to the present technology, the number of the speakers SP11 constituting the speaker system, the replaying band that each speaker SP11 has, and the arrangement position of the speaker SP11 having each replaying band can be an arbitrary number, replaying band, and arrangement position.

<Configuration Example of Audio Replaying System>

Figure 2:
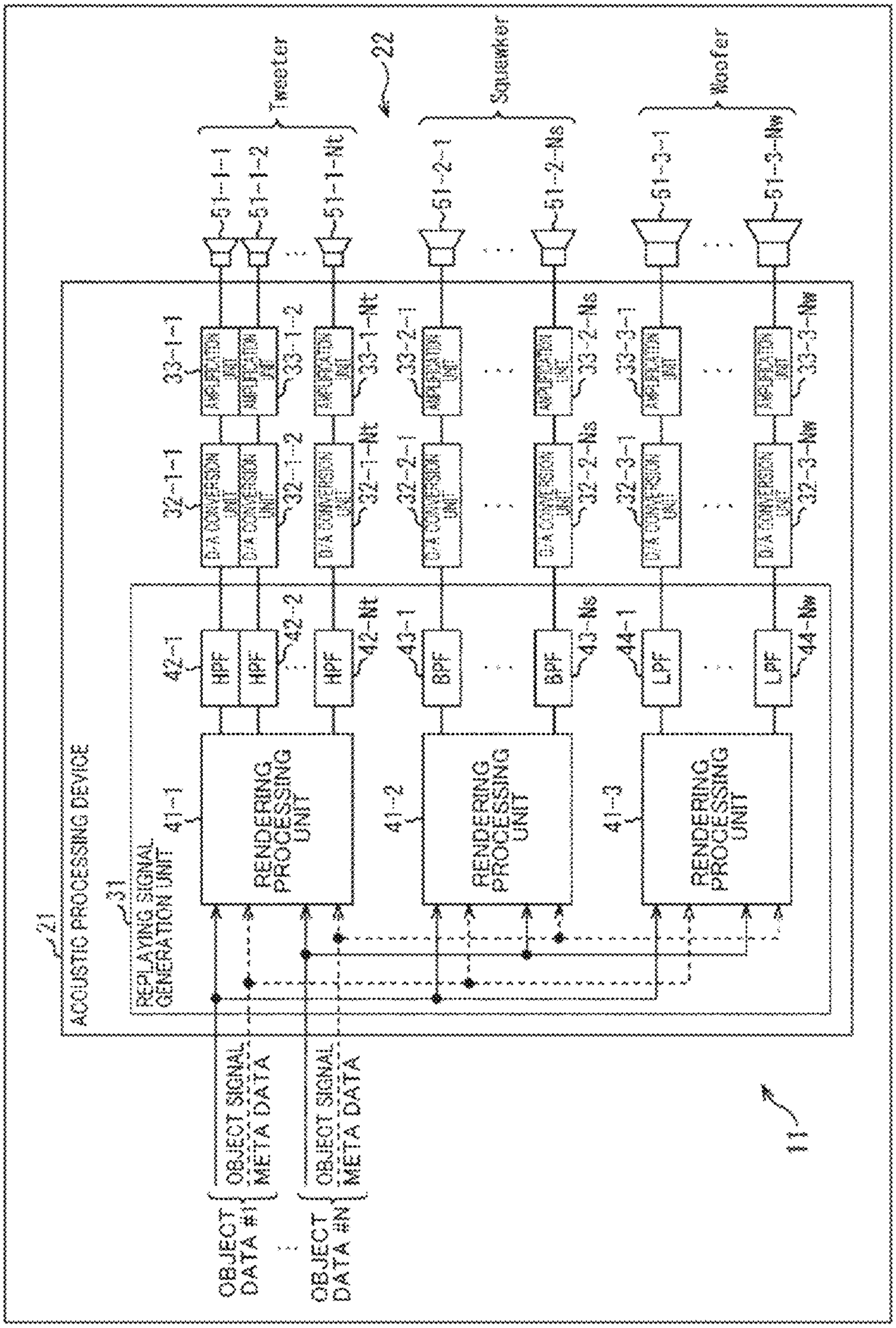
FIG. 2 is a diagram illustrating a configuration example of an audio replaying system.

FIG. 2 is a diagram illustrating a configuration example of an embodiment of an audio replaying system to which the present technology is applied.

An audio replaying system 11 illustrated in FIG. 2 includes an acoustic processing device 21 and a speaker system 22 and replays object-based audio content on the basis of supplied object data.

Although the content includes N objects and object data of the N objects is supplied in this example, the number of the objects may be any number. Also, the object data of one object includes an object signal for replaying sound of the object and meta data of the object as described above.

The acoustic processing device 21 includes a replaying signal generation unit 31, digital/analog (D/A) conversion units 32-1-1 to 32-3-Nw, and amplification units 33-1-1 to 33-3-Nw.

The replaying signal generation unit 31 performs rendering processing for each replaying band and generates a speaker replaying signal that is an output audio signal as an output.

The replaying signal generation unit 31 includes rendering processing units 41-1 to 41-3, high pass filters (HPFs) 42-1 to 42-Nt, band pass filters (BPFs) 43-1 to 43-Ns, and low pass filters (LPFs) 44-1 to 44-Nw.

The speaker system 22 includes speakers 51-1-1 to 51-1-Nt, speakers 51-2-1 to 51-2-Ns, and speakers 51-3-1 to 51-3-Nw, which have mutually different replaying bands.

Note that in a case where it is not particularly necessary to distinguish the speakers 51-1-1 to 51-1-Nt, the speakers 51-1-1 to 51-1-Nt will also simply be referred to as speakers 51-1.

Similarly, the speakers 51-2-1 to 51-2-Ns will also simply be referred to as speakers 51-2 in a case where it is not particularly necessary to distinguish the speakers 51-2-1 to 51-2-Ns, and the speakers 51-3-1 to 51-3-Nw will also simply be referred to as speakers 51-3 in a case where it is not particularly necessary to distinguish the speakers 51-3-1 to 51-3-Nw.

Also, in a case where it is not particularly necessary to distinguish the speakers 51-1 to 51-3, the speakers 51-1 to 51-3 will also simply be referred to as speakers 51 below. The speakers 51 constituting the speaker system 22 correspond to the speakers SP11 illustrated in FIG. 1.

The rendering processing units 41-1 to 41-3 perform rendering processing such as VBAP on the basis of the object signal and the meta data constituting the supplied object data and generate a speaker replaying signal of each speaker 51.

For example, the rendering processing unit 41-1 performs the rendering processing for each of the N objects and generates, for each object, each speaker replaying signal output to each of the speakers 51-1-1 to 51-1-Nt as an output destination.

Also, the rendering processing unit 41-1 adds the speaker replaying signal for each object generated for the same speakers 51-1 and obtains the result as a final speaker replaying signal for the speakers 51-1. Sound based on the thus obtained speaker replaying signal includes sound for each of N objects.

The rendering processing unit 41-1 supplies, to the HPFs 42-1 to 42-Nt, the final speaker replaying signal generated for the speakers 51-1-1 to 51-1-Nt.

The rendering processing unit 41-2 also generates the speaker replaying signal of each speaker 51-2 for replaying sound of the N objects output to each of the speakers 51-2-1 to 51-2-Ns as a final output destination and supplies it to the BPFs 43-1 to 43-Ns similarly to the rendering processing unit 41-1.

The rendering processing unit 41-3 also generates a speaker replaying signal of each speaker 51-3 for replaying sound of the N objects output to each of the speakers 51-3-1 to 51-3-Nw as a final output destination and supplies it to the LPFs 44-1 to 44-Nw similarly to the rendering processing unit 41-1.

Hereinafter, in a case where it is not particularly necessary to distinguish the rendering processing units 41-1 to 41-3, the rendering processing units 41-1 to 41-3 will also simply be referred to as rendering processing units 41.

The HPF 42-1 to 42-Nt are HPFs that allow at least components in a frequency band including the replaying band of the speakers 51-1, that is, high-frequency component to pass therethrough and block middle and low-frequency components.

The HPFs 42-1 to 42-Nt perform filtering processing on the speaker replaying signal supplied from the rendering processing unit 41-1 and supply the speaker replaying signal including only the high-frequency components obtained as a result to the D/A conversion unit 32-1-1 to 32-1-Nt.

Note that in a case where it is not particularly necessary to distinguish the HPFs 42-1 to 42-Nt, the HPFs 42-1 to 42-Nt will also simply be referred to as HPFs 42 below. The HPFs 42 can function as a band restriction processing unit that performs band restriction processing called filtering processing by the HPFs in accordance with the replaying band that the speakers 51-1 have on the input speaker replaying signal and generating a speaker replaying signal with a restricted band (band restriction signal).

The BPFs 43-1 to 43-Ns are BPFs that allow at least components in a frequency band including the replaying band of the speaker 51-2, that is, the middle-frequency component to pass therethrough and block other components.

The BPFs 43-1 to 43-Ns perform the filtering processing on the speaker replaying signal supplied from the rendering processing unit 41-2 and supplies the speaker replaying signal including only the middle-frequency components obtained as a result to the D/A conversion units 32-2-1 to 32-2-Ns.

In a case where it is not particularly necessary to distinguish the BPFs 43-1 to 43-Ns, the BPFs 43-1 to 43-Ns will also simply be referred to as BPFs 43. The BPFs 43 can function as a band restriction processing unit that performs band restriction processing called filtering processing by the BPFs in accordance with the replaying band of the speakers 51-2 on the input speaker replaying signal and generates a speaker replaying signal with a restricted band (band restriction signal).

The LPFs 44-1 to 44-Nw are LPFs that allow at least components in a frequency band including the replaying band of the speakers 51-3, that is, the low-frequency band to pass therethrough and block components in the middle and high-frequency band.

The LPFs 44-1 to 44-Nw perform filtering processing on the speaker replaying signal supplied from the rendering processing unit 41-3 and supply the speaker replaying signal including only the low-frequency components obtained as a result to the D/A conversion units 32-3-1 to 32-3-Nw.

In a case where it is not particularly necessary to distinguish the LPFs 44-1 to 44-Nw, the LPFs 44-1 to 44-Nw will also simply be referred to as LPFs 44 below. The LPFs 44 can function as a band restriction processing unit that performs band restriction processing called filtering processing by the LPFs in accordance with the replaying band that the speakers 51-3 have on the input speaker replaying signal and generates a speaker replaying signal with a restricted band (band restriction signal).

The D/A conversion units 32-1-1 to 32-1-Nt performs D/A conversion on the speaker replaying signals supplied from the HPFs 42-1 to 42-Nt and supply analog speaker replaying signals obtained as a result to the amplification units 33-1-1 to 33-1-Nt.

In a case where it is not particularly necessary to distinguish the D/A conversion units 32-1-1 to 32-1-Nt, the D/A conversion units 32-1-1 to 32-1-Nt will also simply be referred to as D/A conversion units 32-1 below.

The D/A conversion units 32-2-1 to 32-2-Ns perform D/A conversion on the speaker replaying signals supplied from the BPFs 43-1 to 43-Ns and supplies analog speaker replaying signals obtained as a result to the amplification units 33-2-1 to 33-2-Ns.

In a case where it is not particularly necessary to distinguish the D/A conversion units 32-2-1 to 32-2-Ns, the D/A conversion units 32-2-1 to 32-2-Ns will also simply be referred to as D/A conversion units 32-2 below.

The D/A conversion units 32-3-1 to 32-3-Nw perform D/A conversion on the speaker replaying signals supplied from the LPFs 44-1 to 44-Nw and supplies analog speaker replaying signals obtained as a result to the amplification units 33-3-1 to 33-3-Nw.

In a case where it is not particularly necessary to distinguish the D/A conversion units 32-3-1 to 32-3-Nw, the D/A conversion units 32-3-1 to 32-3-Nw will also simply be referred to as D/A conversion units 32-3. Also, in a case where it is not particularly necessary to distinguish the D/A conversion units 32-1 to 32-3, the D/A conversion units 32-1 to 32-3 will also simply be referred to as D/A conversion units 32.

The amplification units 33-1-1 to 33-1-Nt amplify the speaker replaying signals supplied from the D/A conversion units 32-1-1 to 32-1-Nt and supplies them to the speakers 51-1-1 to 51-1-Nt.

The amplification units 33-2-1 to 33-2-Ns amplify the speaker replaying signals supplied from the D/A conversion units 32-2-1 to 32-2-Ns and supply them to the speakers 51-2-1 to 51-2-Ns.

The amplification units 33-3-1 to 33-3-Nw amplify the speaker replaying signals supplied from the D/A conversion units 32-3-1 to 32-3-Nw and supply them to the speakers 51-3-1 to 51-3-Nw.

The amplification units 33-1-1 to 33-1-Nt will also simply be referred to as amplification units 33-1 in a case where it is not particularly necessary to distinguish the amplification units 33-1-1 to 33-1-Nt, and the amplification units 33-2-1 to 33-2-Ns will also simply be referred to as amplification units 33-2 in a case where it is not particularly necessary to distinguish the amplification units 33-2-1 to 33-2-Ns below.

Hereinafter, the amplification units 33-3-1 to 33-3-Nw will also simply be referred to as amplification units 33-3 in a case where it is not particularly necessary to distinguish the amplification units 33-3-1 to 33-3-Nw, and the amplification units 33-1 to 33-3 will also simply be referred to as amplification units 33 in a case where it is not particularly necessary to distinguish the amplification units 33-1 to 33-3.

Note that the D/A conversion units 32 and the amplification units 33 may be provided outside the acoustic processing device 21.

The speakers 51-1-1 to 51-1-Nt output sound on the basis of the speaker replaying signals supplied from the amplification units 33-1-1 to 33-1-Nt.

Each of the Nt speakers 51-1 constituting the speaker system 22 is a speaker having the replaying band mainly in the high-frequency band and called a tweeter. In the speaker system 22, the Nt speakers 51-1 form one speaker layout for the high-frequency band.

The speakers 51-2-1 to 51-2-Ns output sound on the basis of the speaker replaying signals supplied from the amplification units 33-2-1 to 33-2-Ns.

Each of the Ns speakers 51-2 constituting the speaker system 22 is a speaker having a replaying band mainly in the middle-frequency band and called a squawker. In the speaker system 22, the Ns speakers 51-2 form one speaker layout for the middle-frequency band.

The speakers 51-3-1 to 51-3-Nw output sound on the basis of the speaker replaying signals supplied from the amplification units 33-3-1 to 33-3-Nw.

Each of Nw speakers 51-3 constituting the speaker system 22 is a speaker having the replaying band mainly in the low-frequency band and called a woofer. In the speaker system 22, the Nw speakers 51-3 form one speaker layout for the low-frequency band.

The speaker system 22 is configured of the plurality of speakers 51 having mutually different replaying bands, namely the high-frequency band, the middle-frequency band, and the low-frequency band. In other words, the plurality of speakers 51 having mutually different replaying bands are arranged together in the surroundings of the listener who listens to the content.

Note that although the example in which the speaker system 22 configured of the speakers 51-1 to 51-3 is provided separately from the acoustic processing device 21 will be described here, a configuration in which the speaker system 22 is provided in the acoustic processing device 21 may also be employed. In other words, the speaker system 22 may be included in the acoustic processing device 21.

As described above, the rendering processing is performed for each replaying band of the speakers 51, that is, for each speaker layout having each replaying band in the audio replaying system 11.

Therefore, in a case where the rendering processing units 41-1 perform VBAP as the rendering processing, for example, the aforementioned selected mesh is selected from among the meshes formed by the Nt speakers 51-1 by the rendering processing unit 41-1.

Similarly, the aforementioned selected mesh is selected from the meshes formed by the Ns speakers 51-2 by the rendering processing unit 41-2, and the aforementioned selected mesh is selected from the meshes formed by the Nw speakers 51-3 by the rendering processing unit 41-3.

Figure 3:
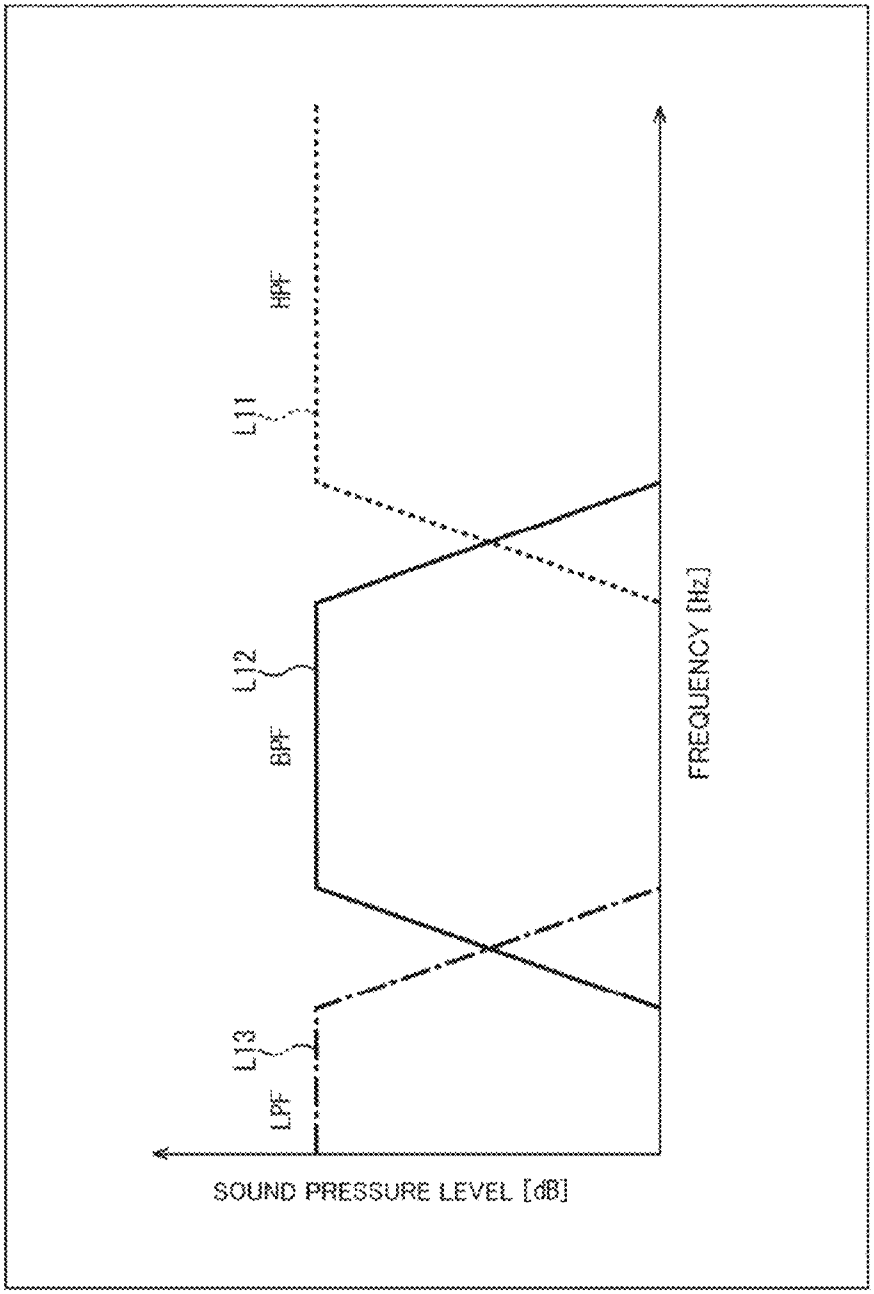
FIG. 3 is a diagram illustrating frequency property examples of HPF, BPF, and LPF.

Also, frequency properties, that is, the restriction bands (passing bands) of the HPF 42, the BPF 43, and the LPF 44 functioning as the band restriction processing units are as illustrated in FIG. 3, for example. Note that the horizontal axis represents a frequency (Hz) while the vertical axis represents a sound pressure level (dB) in FIG. 3.

In FIG. 3, the polygonal line L11 indicates the frequency property of the HPF 42, the polygonal line L12 indicates the frequency property of the BPF 43, and the polygonal line L13 indicates the frequency property of the LPF 44.

As can be known from the polygonal line L11, the HPF 42 performs high-frequency band passing filtering of allowing components in a frequency band that is higher than other frequency bands of the BPF 43 and the LPF 44, that is, high-frequency components to pass therethrough.

Also, it is possible to ascertain that the BPF 43 performs middle-frequency band passing filtering of allowing components in a frequency band that is higher than that of the LPF 44 and lower than that of the HPF 42, that is, middle-frequency components to pass therethrough. It is possible to ascertain that the LPF 44 performs low-frequency band passing filtering of allowing components in a frequency band that is lower than other frequency bands of the BPF 43 and the HPF 42, that is, low-frequency components to pass therethrough.

Moreover, the passing bands of the HPF 42 and the BPF 43 cross over each other, and the passing bands of the BPF 43 and the LPF 44 also cross over each other. Although the example in which the passing bands of the HPF 42 and the BPF 43 cross over each other and the passing bands of the BPF 43 and the LPF 44 cross over each other has been described here, the present technology is not limited thereto. For example, both the passing bands of the HPF 42 and the BPF 43 and the passing bands of the BPF 43 and the LPF 44 may not cause cross-over, or either one of them may have a property of crossing over.

Note that although it is assumed that the Nt HPFs 42 have the same property (frequency property) in the audio replaying system 11, the Nt HPFs 42 may be filters (HPFs) having mutually different properties.

Also, the HPFs 42 may not be provided between the rendering processing units 41-1 and the speakers 51-1, and the speaker replaying signals obtained by the rendering processing units 41-1 may be supplied to the speakers 51-1 via the D/A conversion units 32-1 and the amplification units 33-1. In other words, sound based on the speaker replaying signals may be replayed by the speakers 51-1 without performing the filtering processing (band restriction processing) by the HPFs 42.

Similarly, although it is assumed that the Ns BPFs 43 have the same property (frequency property), the BPFs 43 may have mutually different properties, and the BPFs 43 may not be provided between the rendering processing units 41-2 and the speakers 51-2.

Moreover, although it is assumed that the Nw LPFs 44 have the same property (frequency property), the LPFs 44 may have mutually different properties, and the LPFs 44 may not be provided between the rendering processing units 41-3 and the speaker 51-3.

<Explanation of Replaying Processing>

Next, operations of the audio replaying system 11 will be described. In other words, the replaying processing performed by the audio replaying system 11 will be described below with reference to the flowchart in FIG. 4. The replaying processing starts once object data of N objects constituting content is supplied to each rendering processing unit 41.

In Step S11, the rendering processing unit 41-1 performs rendering processing for the speakers 51-1 for the high-frequency band on the basis of the supplied N pieces of object data and supplies speaker replaying signals obtained as a result to the HPFs 42.

In other words, rendering is performed for the speaker layout configured of the Nt speakers 51-1, and the speaker replaying signals as output audio signals are generated. For example, in Step S11, VBAP is performed as the rendering processing by using the mesh formed by the Nt speakers 51-1.

In Step S12, the HPFs 42 perform filtering processing (band restriction processing) using the HPF on the speaker replaying signals supplied from the rendering processing units 41-1 and supplies the speaker replaying signals after the band restriction obtained as a result to the D/A conversion units 32-1.

The D/A conversion units 32-1 perform D/A conversion on the speaker replaying signals supplied from the HPFs 42 and supply them to the amplification units 33-1, and the amplification units 33-1 amplify the speaker replaying signals supplied from the D/A conversion units 32-1 and supply them to the speakers 51-1.

In Step S13, the rendering processing unit 41-2 performs rendering processing for the speakers 51-2 for the middle-frequency band on the basis of the supplied N pieces of object data and supplies the speaker replaying signals obtained as a result to the BPFs 43.

For example, in Step S13, VBAP is performed as the rendering processing by using a mesh formed by the Ns speakers 51-2.

In Step S14, the BPFs 43 perform filtering processing (band restriction processing) using the BPFs on the speaker replaying signals supplied from the rendering processing unit 41-2 and supplies the speaker replaying signals after the band restriction obtained as a result to the D/A conversion units 32-2.

The D/A conversion units 32-2 perform D/A conversion on the speaker replaying signals supplied from the BPFs 43 and supply the speaker replaying signals to the amplification units 33-2, and the amplification units 33-2 amplify the speaker replaying signals supplied from the D/A conversion units 32-2 and supply the speaker replaying signals to the speakers 51-2.

In Step S15, the rendering processing unit 41-3 performs rendering processing for the speakers 51-3 for the low-frequency band on the basis of the supplied N pieces of object data and supplies the speaker replaying signals obtained as a result to the LPFs 44.

In Step S15, for example, VBAP is performed as the rendering processing by using a mesh formed by the Nw speakers 51-3.

In Step S16, the LPFs 44 perform filtering processing (band restriction processing) using the LPFs on the speaker replaying signals supplied from the rendering processing unit 41-3 and supplies the speaker replaying signals after the band restriction obtained as a result to the D/A conversion units 32-3.

The D/A conversion units 32-3 perform D/A conversion on the speaker replaying signals supplied from the LPFs 44 and supply the speaker replaying signals to the amplification units 33-3, and the amplification units 33-3 amplify the speaker replaying signals supplied from the D/A conversion units 32-3 and supply the speaker replaying signals to the speakers 51-3.

In Step S17, all the speakers 51 constituting the speaker system 22 output sound on the basis of the speaker replaying signals supplied from the amplification units 33, and the replaying processing is then ended.

Once the sound based on the speaker replaying signals is output from all the speakers 51, sound of N objects is replayed for each replaying band by the speaker layout of each replaying band. Then, a sound image of each of the N objects is localized at the object position indicated by the position information included in the meta data of each object.

As described above, the audio replaying system 11 performs the rendering processing for each of the replaying bands that the speakers 51 have, that is, each of the speaker layouts of the plurality of replaying bands and replays the content. It is thus possible to curb degradation of sound quality due to the replaying bands of the speakers 51 and to perform audio replay with higher sound quality.

Specifically, the speakers 51 having different replaying bands are present together in the audio replaying system 11, for example.

However, the speaker layout configuration is prepared for each of the plurality of replaying bands, and each object is rendered and replayed for each replaying band in the audio replaying system 11.

Therefore, the object is replayed by being appropriately localized for each speaker layout of the replaying band, and rendering replay of more appropriate object-based audio is realized. In this manner, it is possible to avoid degradation of sound quality such as disappearing of sound by the frequency bands and the localization positions that the objects have, for example. In other words, it is possible to perform audio replaying with higher sound quality.

Second Embodiment

<Configuration Example of Audio Replaying System>

Note that the example in which the filtering processing for the band restriction in accordance with the target speaker layout is performed on the output of the rendering processing unit 41 has been described above.

However, the present technology is not limited thereto, and the filtering processing for the band restriction in accordance with the target speaker layout may be performed on the object signal serving as an input to the rendering processing unit 41, for example.

Figure 5:
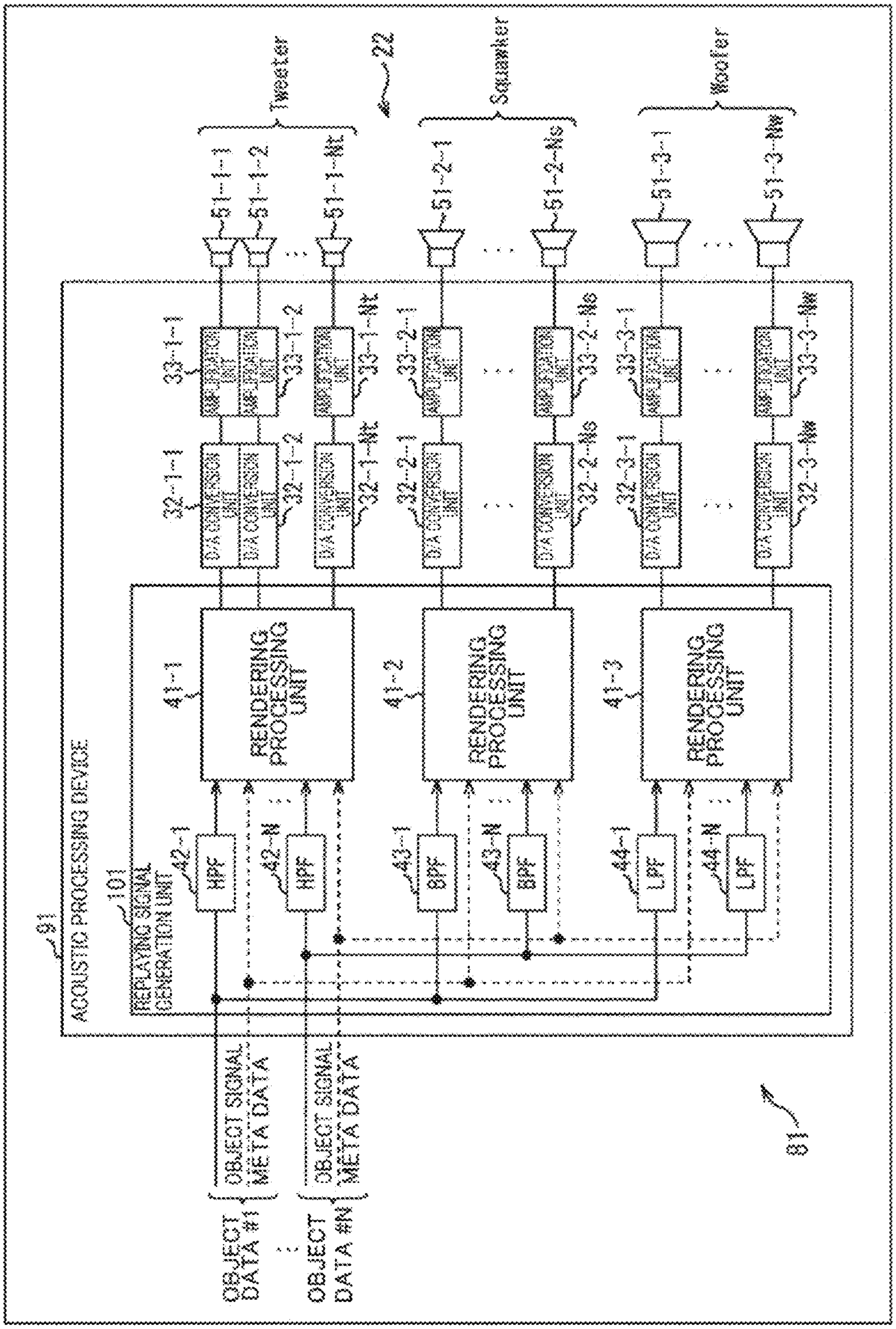
FIG. 5 is a diagram illustrating a configuration example of an audio replaying system.

In such a case, the audio replaying system is configured as illustrated in FIG. 5, for example. Note that in FIG. 5, the same reference signs are applied to parts corresponding to those in the case of FIG. 2 and description thereof will be appropriately omitted.

An audio replaying system 81 illustrated in FIG. 5 includes an acoustic processing device 91 and a speaker system 22.

Also, the acoustic processing device 91 includes a replaying signal generation unit 101, D/A conversion units 32-1-1 to 32-3-Nw, and amplification units 33-1-1 to 33-3-Nw.

The replaying signal generation unit 101 includes HPFs 42-1 to 42-N, BPFs 43-1 to 43-N, LPFs 44-1 to 44-N, and the rendering processing units 41-1 to 41-3.

The configuration of the audio replaying system 81 is different from the configuration of the audio replaying system 11 illustrated in FIG. 2 in that the acoustic processing device 91 is provided instead of the acoustic processing device 21, and the other points have the same configurations as those of the audio replaying system 11.

Particularly, the configuration of the acoustic processing device 91 is a configuration in which the replaying signal generation unit 31 in the acoustic processing device 21 is replaced with the replaying signal generation unit 101.

As described above, the replaying signal generation unit 31 is provided with the HPFs 42, the BPFs 43, and the LPFs 44 in a later stage of the rendering processing unit 41.

On the other hand, the replaying signal generation unit 101 is provided with the HPFs 42, the BPFs 43, and the LPFs 44 in the previous stage of the rendering processing unit 41.

Furthermore, since the filtering processing (band restriction processing) is performed on the object signals of the N objects as inputs of the rendering processing unit 41, the replaying signal generation unit 101 is provided with N HPFs 42, N BPFs 43, and N LPFs 44. In other words, the HPF 42, the BPF 43, and the LPF 44 are provided for each object.

Therefore, each of the HPFs 42-1 to 42-N performs filtering processing on each of the supplied object signals of the N pieces of object data and supplies the object signals including only high-frequency components obtained as a result to the rendering processing unit 41-1. Note that the HPFs 42-1 to 42-N perform the same filtering processing (band restriction processing) as that of the HPFs 42 in the replaying signal generation unit 31.

Similarly, each of the BPFs 43-1 to 43-N performs filtering processing on each of the supplied object signals of N pieces of object data and supplies the object signals including only the middle-frequency components obtained as a result to the rendering processing unit 41-2. The BPFs 43-1 to 43-N perform the same filtering processing (band restriction processing) as that of the BPFs 43 in the replaying signal generation unit 31.

Each of the LPFs 44-1 to 44-N performs filtering processing on each of the supplied object signals of N pieces of object data and supplies the object signals including only low-frequency components obtained as a result to the rendering processing unit 41-3. The LPFs 44-1 to 44-N perform the same filtering processing (band restriction processing) as that of the LPFs 44 in the replaying signal generation unit 31.

In this manner, while the HPF 42, the BPF 43, and the LPF 44 are provided for each speaker 51 in the audio replaying system 11 illustrated in FIG. 2, the audio replaying system 81 is provided with the HPF 42, the BPF 43, and the LPF 44 for each object.

Since the content includes N objects in this example, the audio replaying system 81 is provided with N HPFs 42, N BPFs 43, and N LPFs 44.

Note that although the N HPFs 42 have the same frequency property in this example as well similarly to the case of the audio replaying system 11, the N HPFs 42 may be filters (HPFs) having mutually different properties, or the HPFs 42 may not be provided in the previous stage of the rendering processing unit 41-1.

Similarly, although the N BPFs 43 have the same property (frequency property), the BPFs 43 may have mutually different properties, and the BPFs 43 may not be provided in the previous stage of the rendering processing unit 41-2.

Furthermore, although the N LPFs 44 have the same property (frequency property), the LPFs 44 may have mutually different properties, and the LPFs 44 may not be provided in the previous stage of the rendering processing unit 41-3.

<Explanation of Replaying Processing>

Next, the replaying processing performed by the audio replaying system 81 will be described with reference to the flowchart in FIG. 6.

In Step S41, each of the HPFs 42-1 to 42-N performs filtering processing using the HPF on each of the supplied object signals of the N objects and supplies the object signal after the band restriction obtained as a result to the rendering processing unit 41-1.

In Step S42, the rendering processing unit 41-1 performs rendering processing for the speakers 51-1 for the high-frequency band on the basis of the supplied meta data of the N object and the N object signals supplied from the HPFs 42-1 to 42-N.

Figure 4:
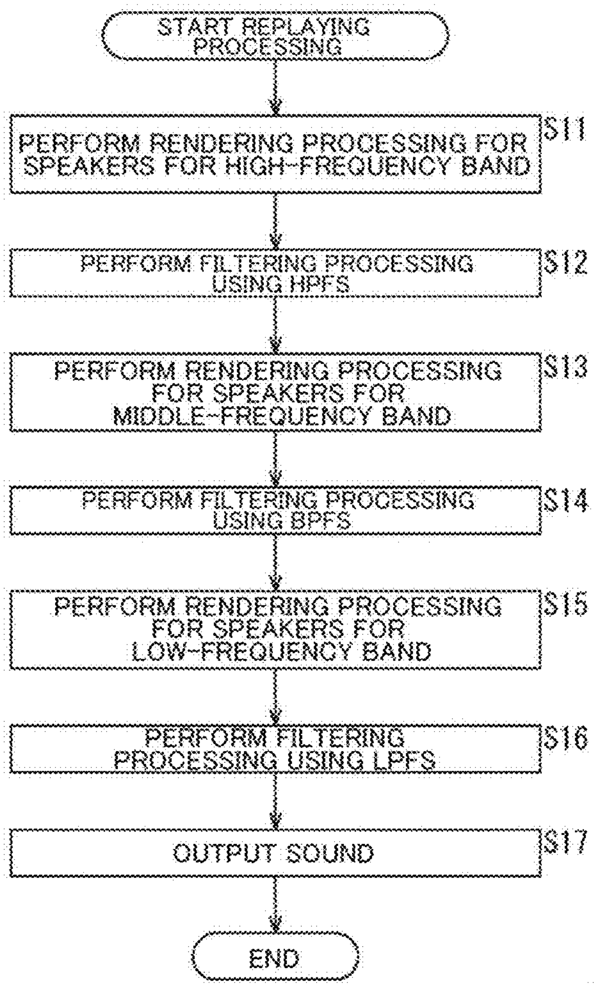
FIG. 4 is a flowchart for explaining replaying processing.

In Step S42, for example, processing that is similar to that in Step S11 in FIG. 4 is performed. The rendering processing unit 41-1 supplies the speaker replaying signals corresponding to the speakers 51-1 obtained through the rendering processing to the D/A conversion units 32-1-1 to 32-1-Nt.

The D/A conversion unit 32-1 performs D/A conversion on the speaker replaying signals supplied from the rendering processing unit 41-1 and supplies the speaker replaying signals to the amplification units 33-1, and the amplification units 33-1 amplify the speaker replaying signals supplied from the D/A conversion units 32-1 and supply the speaker replaying signals to the speakers 51-1.

In Step S43, each of the BPFs 43-1 to 43-N performs filtering processing by the BPF on each of the supplied object signals of the N objects and supplies the object signal after the band restriction obtained as a result to the rendering processing unit 41-2.

In Step S44, the rendering processing unit 41-2 performs rendering processing for the speakers 51-2 for the middle-frequency band on the basis of the supplied meta data of the N objects and the N object signals supplied from the BPFs 43-1 to 43-N.

In Step S44, for example, processing that is similar to that in Step S13 in FIG. 4 is performed. The rendering processing unit 41-2 supplies the speaker replaying signals corresponding to the speakers 51-2 obtained through the rendering processing to the D/A conversion units 32-2-1 to 32-2-Ns.

The D/A conversion unit 32-2 performs D/A conversion on the speaker replaying signals supplied from the rendering processing unit 41-2 and supplies the speaker replaying signals to the amplification units 33-2, and the amplification units 33-2 amplify the speaker replaying signals supplied from the D/A conversion units 32-2 and supply the speaker replaying signals to the speakers 51-2.

In Step S45, each of the LPFs 44-1 to 44-N performs filtering processing using the LPFs on each of the supplied object signals of the N objects and supplies the object signals after the band restriction obtained as a result to the rendering processing unit 41-3.

In Step S46, the rendering processing unit 41-3 performs rendering processing for the speakers 51-3 for the low-frequency band on the basis of the supplied meta data of the N objects and the N object signals supplied from the LPFs 44-1 to 44-N.

In Step S46, for example, processing that is similar to that in Step S15 in FIG. 4 is performed. The rendering processing unit 41-3 supplies the speaker replaying signals corresponding to the speakers 51-3 obtained through the rendering processing to the D/A conversion units 32-3-1 to 32-3-Nw.

The D/A conversion unit 32-3 performs D/A conversion on the speaker replaying signals supplied from the rendering processing unit 41-3 and supplies the speaker replaying signals to the amplification units 33-3, and the amplification units 33-3 amplify the speaker replaying signals supplied from the D/A conversion units 32-3 and supply the speaker replaying signals to the speakers 51-3.

Although once the rendering processing is performed for the speaker layout of each replaying band in this manner, then the processing in Step S47 is performed, and the replaying processing is ended, the processing in Step S47 is similar to the processing in Step S17 in FIG. 4, and the description thereof will thus be omitted.

As described above, the audio replaying system 81 performs the filtering processing for each object, then performs the rendering processing for each speaker layout of each of the plurality of replaying bands, and replays the content. It is thus possible to curb degradation of sound quality due to the replaying bands of the speakers 51 and to perform audio replaying with higher sound quality.

With the configuration in which the filtering processing is performed before the rendering processing as in the audio replaying system 81, it is possible to reduce the processing amount in a case where the number of objects constituting the content (the number N of the objects) is small, in particular, as compared with the case of the audio replaying system 11.

For example, it is assumed that the processing amounts of the filtering processing performed by the HPFs 42, the BPFs 43, and the LPFs 44 are the same. In such a case, the processing amount (the number of processes) of the filtering processing required in the audio replaying system 81 is the number N of the objects×3. Here, "3" is the number of the rendering processing units 41.

On the other hand, the filtering processing is performed the number of times corresponding to the total number (Nt+Ns+Nw) of the speakers 51 constituting the speaker system 22 in the audio replaying system 11.

Therefore, in a case where the number N of the objects×3 is smaller than the total number (Nt+Ns+Nw) of the speakers 51, it is possible to reduce the number of processes (the number of times of the processing) of the filtering processing as compared with the case of the audio replaying system 11 by employing the configuration of the audio replaying system 81, and as a result, it is possible to reduce the processing amount as a whole.

Third Embodiment

<Configuration Example of Audio Replaying System>

Incidentally, which of a previous stage and a later stage of the rendering processing the filtering processing is to be performed in to reduce the processing amount depends on the number N of the objects, the total number of the speakers 51, and the number (the number of the rendering processing units 41) of the types (replaying bands) of the speakers 51.

Thus, which of the previous stage and the later stage of the rendering processing the filtering processing is to be performed in may be switched using determination criteria based on the number N of the objects and the total number of the speakers 51, for example.

Figure 7:
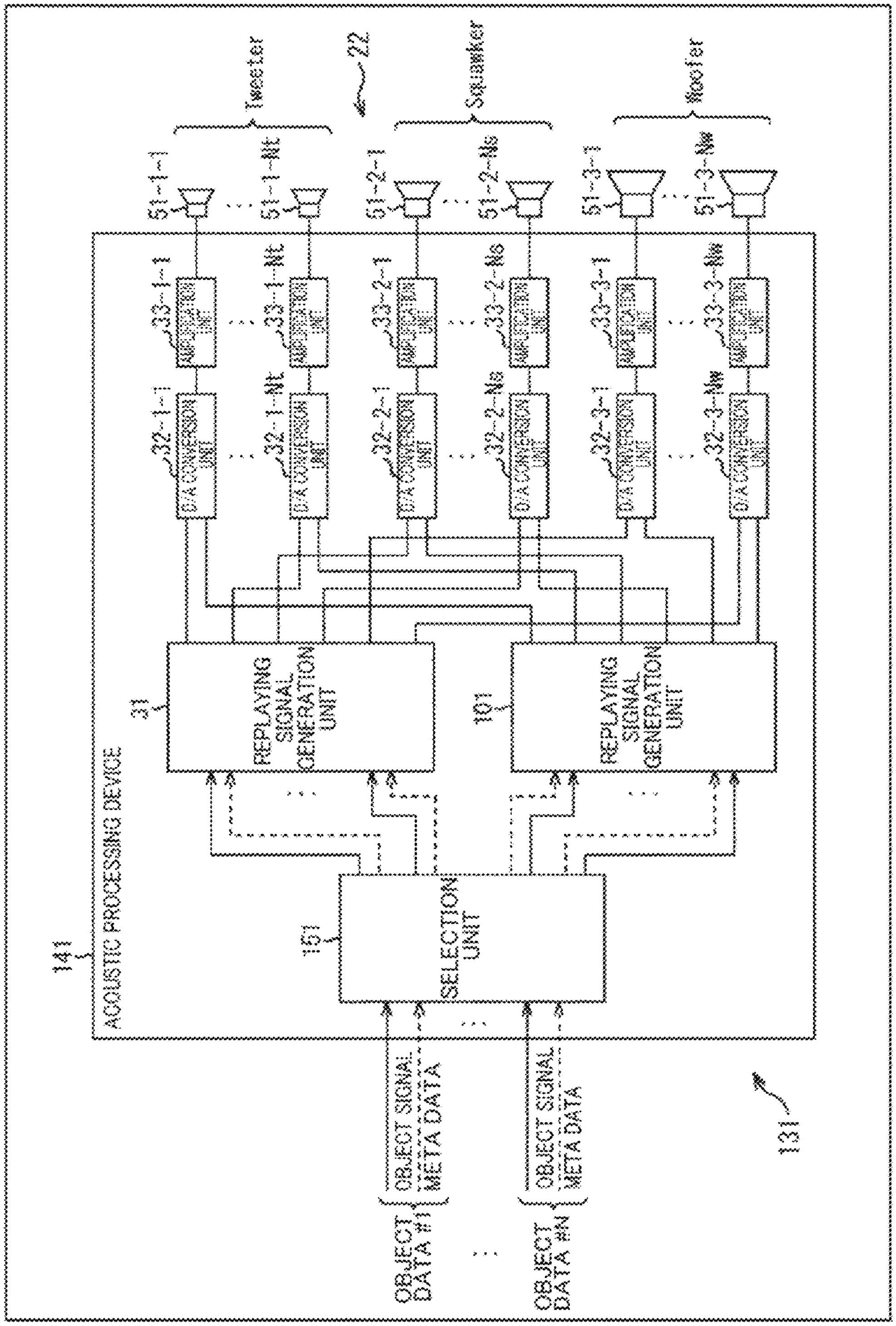
FIG. 7 is a diagram illustrating a configuration example of an audio replaying system.

In such a case, the audio replaying system is configured as illustrated in FIG. 7, for example. Note that in FIG. 7, the same reference signs will be applied to the parts corresponding to those in the case of FIG. 2 or FIG. 5 and description thereof will be appropriately omitted.

An audio replaying system 131 illustrated in FIG. 7 includes an acoustic processing device 141 and a speaker system 22.

Also, the acoustic processing device 141 includes a selection unit 151, a replaying signal generation unit 31, a replaying signal generation unit 101, D/A conversion units 32-1-1 to 32-3-Nw, and amplification units 33-1-1 to 33-3-Nw.

The replaying signal generation unit 31 has the same configuration as that in the case in FIG. 2, and the replaying signal generation unit 101 has the same configuration as that in the case in FIG. 5.

In this example, object data of N objects is input to the selection unit 151. The selection unit 151 selects any one of the replaying signal generation unit 31 and the replaying signal generation unit 101 as an output destination of the object data on the basis of the number N of the objects and the total number of the speakers 51 and outputs the object data to the selected output destination.

In other words, the selection unit 151 selects causing the replaying signal generation unit 31 to perform the rendering processing and then perform the band restriction processing or causing the replaying signal generation unit 101 to perform the band restriction processing and then perform the rendering processing, for each object.

Therefore, any one of the replaying signal generation unit 31 and the replaying signal generation unit 101 generates the speaker replaying signals on the basis of the object data, and the speaker replaying signals are supplied to the D/A conversion units 32 in the audio replaying system 131.

<Explanation of Replaying Processing>

Figure 8:
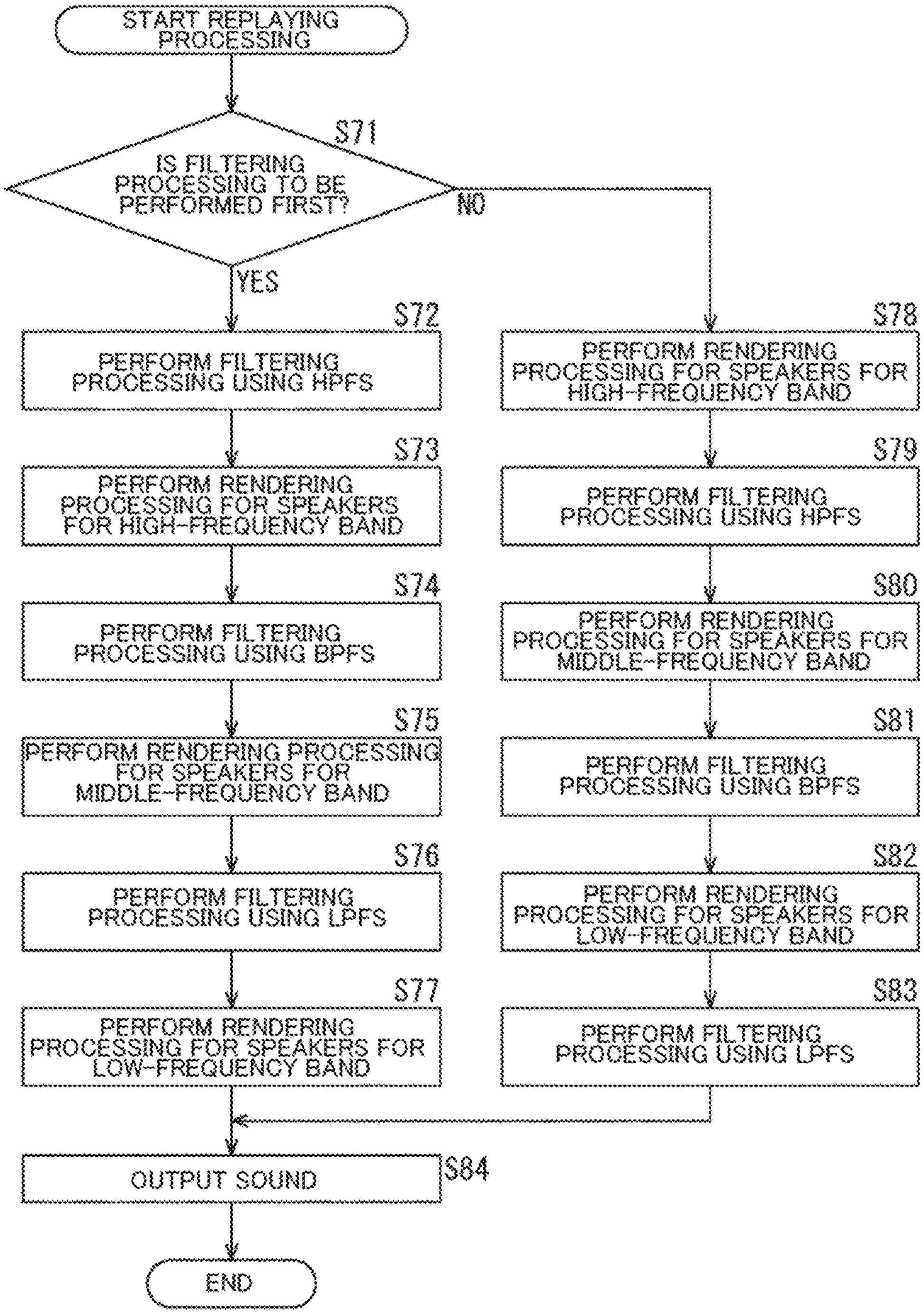
FIG. 8 is a flowchart for explaining replaying processing.

Next, the replaying processing performed by the audio replaying system 131 will be described with reference to the flowchart in FIG. 8. The replaying processing is started once object data of N objects constituting content is supplied to the selection unit 151.

In Step S71, the selection unit 151 determines whether or not to perform filtering processing before rendering processing on the basis of the number N of the pieces of the supplied object data, the total number of the speakers 51, and the number of replaying bands (the number of rendering processing units 41). In other words, the selection unit 151 selects output destinations of the supplied object data. Note that the number of replaying bands, that is, the number of rendering processing units 41 here is "3".

In a case where the number N of the objects×3 is smaller than the total number (Nt+Ns+Nw) of the speakers 51, for example, the selection unit 151 determines that the filtering processing is to be performed first.

On the other hand, in a case where the number N of the objects×3 is equal to or greater than the total number (Nt+Ns+Nw) of the speakers 51, for example, the selection unit 151 determines that the filtering processing is to be performed after the rendering processing.

In a case where it is determined that the filtering processing is to be performed first in Step S71, the selection unit 151 selects the replaying signal generation unit 101 as an output destination of the supplied object data, and the processing then proceeds to Step S72.

In this case, the selection unit 151 supplies the object signal of the supplied object data to the HPFs 42, the BPFs 43, and the LPFs 44 of the replaying signal generation unit 101 and supplies the meta data of the object data to the rendering processing unit 41 of the replaying signal generation unit 101.

Figure 6:
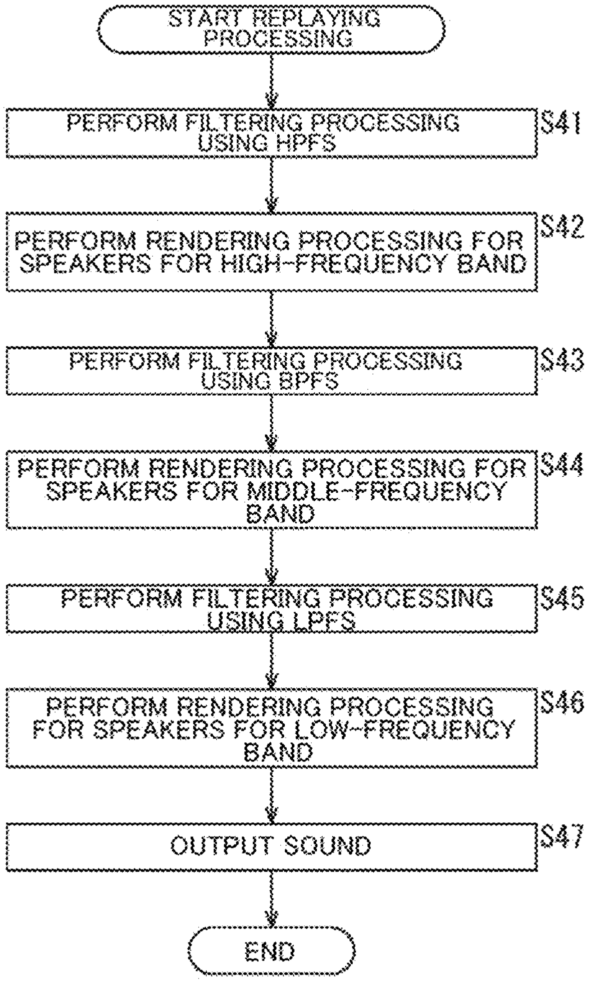
FIG. 6 is a flowchart for explaining replaying processing.

Although the processing in Steps S72 to S77 is performed once the object data is supplied to the replaying signal generation unit 101 in this manner, the processing is similar to the processing in Steps S41 to S46 in FIG. 6, and the description thereof will thus be omitted. If the processing is performed, the speaker replaying signals are supplied to the speakers 51.

On the other hand, in a case where it is determined that the filtering processing is to be performed later in Step S71, the selection unit 151 selects the replaying signal generation unit 31 as an output destination of the supplied object data, and the processing then proceeds to Step S78.

In this case, the selection unit 151 supplies the supplied object data, that is, the object signal and the meta data to the rendering processing unit 41 of the replaying signal generation unit 31.

Although the processing in Steps S78 to S83 is performed after the object data is supplied to the replaying signal generation unit 31, the processing is similar to the processing in Steps S11 to S16 in FIG. 4, and description thereof will be omitted. If the processing is performed, the speaker replaying signals are supplied to the speakers 51.

If the processing in Step S77 or Step S83 is performed, then the processing in Step S84 is performed.

In other words, in Step S84, all the speakers 51 constituting the speaker system 22 output sound on the basis of the speaker replaying signals supplied from the amplification units 33, and the replaying processing is ended.

As described above, the audio replaying system 131 selects one of the replaying signal generation unit 31 and the replaying signal generation unit 101 with which the processing amount is reduced, on the basis of the number N of objects and the total number of speakers 51 and performs the filtering processing and the rendering processing. In other words, which of the replaying signal generation unit 31 and the replaying signal generation unit 101 is to be used to perform the rendering processing and the filtering processing is switched in accordance with the number N of the objects and the total number of the speakers 51.

In this manner, it is possible to perform audio replaying with higher sound quality while requiring a small processing amount. Note that the switching (selection) of which of the replaying signal generation unit 31 and the replaying signal generation unit 101 is to be used to perform the rendering processing and the filtering processing may be performed for each frame.

Particularly, performing the band restriction in accordance with the speaker layout for each replaying band on the speaker replaying signals by the replaying signal generation unit 31 is effective in a case where the number N of the objects is large. On the other hand, performing the band restriction in accordance with the speaker layout for each replaying band on the object signal by the replaying signal generation unit 101 is effective in a case where the number N of the objects is small.

Fourth Embodiment

<Configuration Example of Audio Replaying System>

Also, the speaker layout for replaying sound of the object may be switched depending on content of the object, that is, features that the object has, such as a sound source type of the object, properties of the object signal, and the like.

Figure 9:
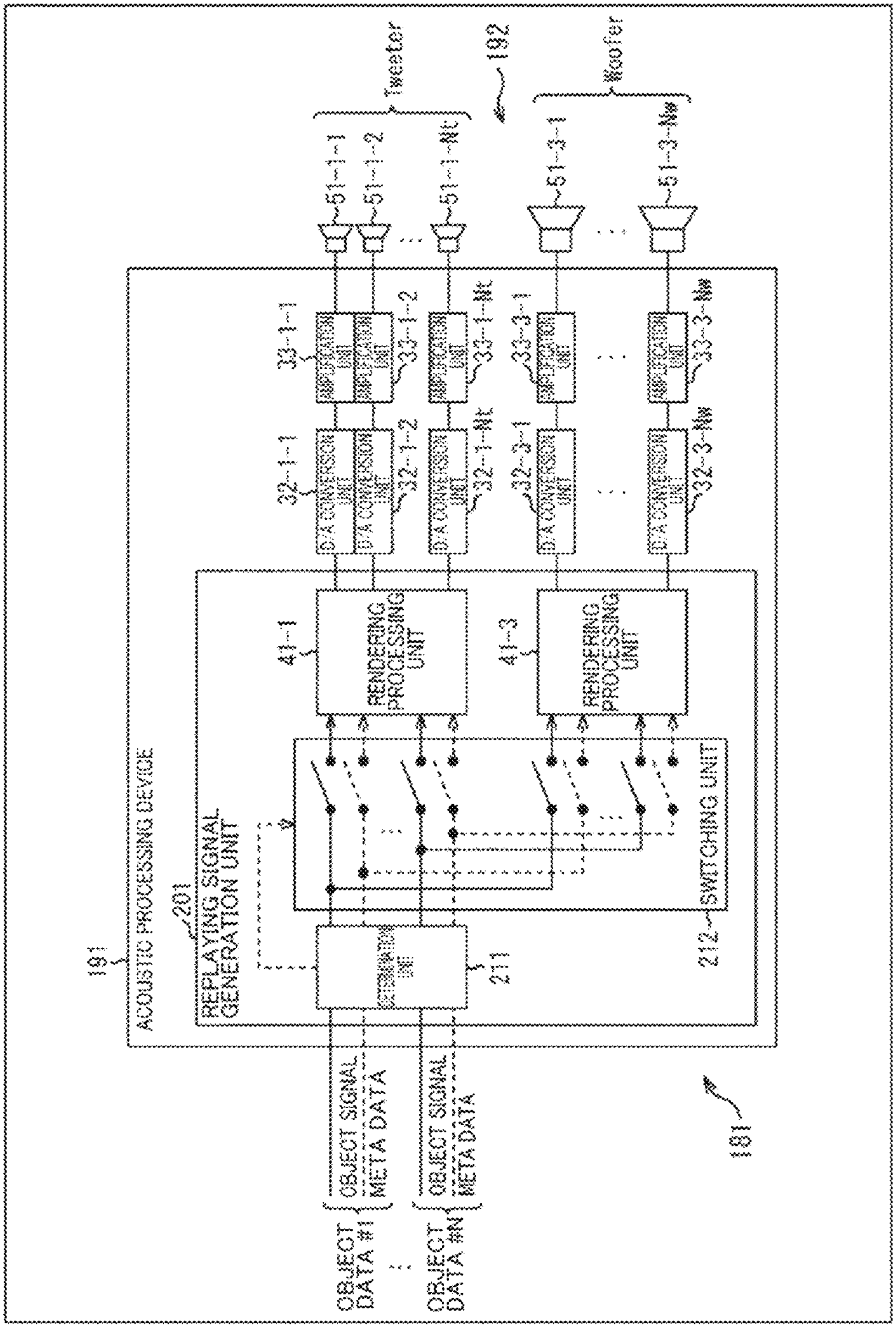
FIG. 9 is a diagram illustrating a configuration example of an audio replaying system.

In such a case, the audio replaying system is configured as illustrated in FIG. 9, for example. Note that in FIG. 9, the same reference signs will be applied to parts corresponding to those in the case of FIG. 2 and description thereof will be appropriately omitted.

An audio replaying system 181 illustrated in FIG. 9 includes an acoustic processing device 191 and a speaker system 192.

The acoustic processing device 191 includes a replaying signal generation unit 201, D/A conversion units 32-1-1 to 32-1-Nt, D/A conversion units 32-3-1 to 32-3-Nw, amplification units 33-1-1 to 33-1-Nt, and amplification units 33-3-1 to 33-3-Nw.

Also, the replaying signal generation unit 201 includes a determination unit 211, a switching unit 212, a rendering processing unit 41-1, and a rendering processing unit 41-3.

The speaker system 192 includes speakers 51-1-1 to 51-1-Nt and speakers 51-3-1 to 51-3-Nw.

For example, a part of the replaying band of the speakers 51-1 and a part of the replaying band of the speakers 51-3 can overlap, that is, the speakers 51-1 and the speakers 51-3 can have a partially common replaying band.

Also, the replaying signal generation unit 201 is not provided with a filter functioning as a band restriction processing unit such as the HPFs 42. Moreover, although the speaker system 192 is provided with the speakers 51-1 that are tweeters and the speakers 51-3 that are woofers, the speaker system 192 is not provided with the speakers 51-2 that are squawkers. Note that the speaker system 192 may be provided with the speakers 51-2 that are squawkers similarly to the aforementioned speaker system 22.

Object data of N objects is supplied to the determination unit 211.

The determination unit 211 performs determination processing of determining which of the rendering processing units 41 is to be used to perform rendering processing, that is, which of the speaker layouts the replaying is to be performed for each object on the basis of an object signal and meta data included in the supplied object data.

For example, the determination unit 211 determines (decides) whether the rendering processing is to be performed only by the rendering processing unit 41-1, whether the rendering processing is to be performed only by the rendering processing unit 41-3, or whether the rendering processing is performed by both the rendering processing unit 41-1 and the rendering processing 41-3, for each object. At this time, it is possible to perform the determination by using at least either the object signal or the information regarding the object such as meta data, for example.

The determination unit 211 supplies the supplied object data to the switching unit 212, controls the switching unit 212 on the basis of the result of the determination processing, and causes the switching unit 212 to supply the object data to the rendering processing unit 41 in accordance with the result of the determination processing.

For example, which of the replaying bands of the speaker layouts the rendering is to be performed for may be determined for each object on the basis of the frequency property of the object signal as a property that the object has.

In such a case, the determination unit 211 performs frequency analysis based on fast Fourier transform (FFT) on the supplied object signal and determines (decides) which of the replaying bands of the speaker layouts the rendering is to be performed for, that is, which of the rendering processing units 41 the rendering processing is to be performed from the information indicating the frequency property obtained as a result, for example.

Specifically, in a case where the object signal includes only low-frequency band components, for example, the rendering processing can be performed only by the rendering processing unit 41-3.

For example, all the rendering processing units 41 corresponding to the replaying bands perform the rendering processing on each object in the audio replaying system 11. However, in a case where the object signal includes only low-frequency components, degradation of sound quality does not occur even if only the rendering processing unit 41-3 performs the rendering processing.

According to the audio replaying system 181, it is possible to reduce the processing amount without causing degradation of sound quality by performing the rendering processing on the object signal including only the low-frequency components, for example, only by the rendering processing unit 41-3 corresponding to the low-frequency band.

Additionally, in a case where the object signal also includes both low-frequency components and high-frequency components, for example, both the rendering processing unit 41-1 and the rendering processing unit 41-3 can perform the rendering processing.

Furthermore, meta data may include information regarding the object, for example.

Specifically, it is assumed that sound source type information indicating what type of sound source, such as an instrument like a guitar or the like or vocal, for example, the object corresponds to is included in the meta data.

In such a case, the determination unit 211 determines (decides) which of the rendering processing units 41 is to be used to perform the rendering processing on the basis of the sound source type information included in the meta data.

In this case, when the object is a sound source including a lot of high-frequency components such as a high-hat, for example, the rendering processing unit 41-1 targeted at the high-frequency band can perform the rendering processing for the object. Note that which of the rendering processing units 41 is to be used to perform the rendering processing may be defined in advance depending on which of sound source types the object corresponds to. Also, the sound source type of the object may be specified from a file name or the like of the object signal.

Alternatively, a content creator or the like, for example, may designate which of the rendering processing units 41 is to be used to perform the rendering processing depending on which of the objects is to be processed in advance, and designation information indicating the designation result may be included as information regarding the object in meta data.

In such a case, the determination unit 211 determines (decides) which of the rendering processing units 41 is to be used to perform the rendering processing on the object on the basis of the designation information included in the meta data. Note that the designation information may be supplied separately from the object data to the determination unit 211.

The switching unit 212 switches, for each object, an output destination of the object data supplied from the determination unit 211 in accordance with control performed by the determination unit 211.

In other words, the switching unit 212 supplies the object data to the rendering processing unit 41-1, supplies the object data to the rendering processing unit 41-3, or supplies the object data to the rendering processing unit 41-1 and the rendering processing unit 41-3 in accordance with the control performed by the determination unit 211.

<Explanation of Replaying Processing>

Figure 10:
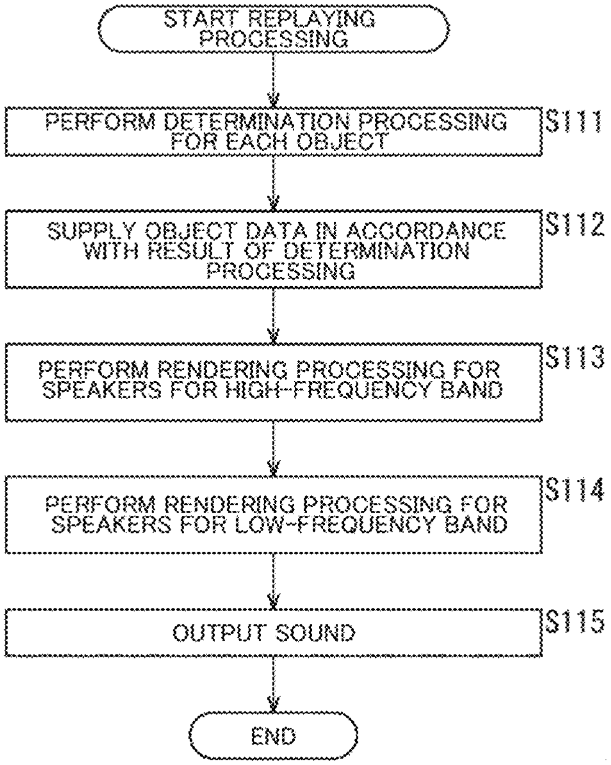
FIG. 10 is a flowchart for explaining replaying processing.

Next, the replaying processing performed by the audio replaying system 181 will be described with reference to the flowchart in FIG. 10. The replaying processing is started once object data of N objects constituting content is supplied to the determination unit 211.

In Step S111, the determination unit 211 performs determination processing for each object on the basis of the supplied object data.

For example, in the determination processing, which of the replaying bands the rendering processing unit 41 that will perform the rendering processing corresponds to, on the basis of at least an object signal and meta data. The determination unit 211 supplies the supplied object data to the switching unit 212 and controls an output of the object data from the switching unit 212 on the basis of the result of the determination processing.

In Step S112, the switching unit 212 performs supply in accordance with the result of the object data determination processing supplied from the determination unit 211 in accordance with control performed by the determination unit 211.

In other words, the switching unit 212 supplies, for each object, the object data supplied from the determination unit 211 to the rendering processing unit 41-1 or the rendering processing unit 41-3, or the rendering processing unit 41-1 and the rendering processing unit 41-3.

In Step S113, the rendering processing unit 41-1 performs rendering processing for the speakers 51-1 for the high-frequency band on the basis of the object data supplied from the switching unit 212 and supplies the speaker replaying signals obtained as a result to the speakers 51-1 via the D/A conversion units 32-1 and the amplification units 33-1.

In Step S114, the rendering processing unit 41-3 performs rendering processing for the speaker 51-3 for the low-frequency band on the basis of the object data supplied from the switching unit 212 and supplies the speaker replaying signals obtained as a result to the speakers 51-3 via the D/A conversion units 32-3 and the amplification units 33-3.

In Step S113 and Step S114, processing that is similar to that in Step S11 and Step S15 in FIG. 4 is performed, for example.

In Step S115, all the speakers 51 constituting the speaker system 192 output sound on the basis of the speaker replaying signals supplied from the amplification units 33, and the replaying processing is then ended.

In this example, the speakers 51-1 for the high-frequency band and the speakers 51-3 for the low-frequency band output sound, and sound of N objects in the content is replayed.

As described above, the audio replaying system 181 determines which of the replaying bands the rendering processing unit 41 that will perform the processing corresponds to on the basis of at least either the object signal and the information regarding the object such as meta data and performs the rendering processing in accordance with the determination result.

In this manner, it is possible to selectively perform the rendering processing by the rendering processing unit 41 corresponding to the appropriate replaying band and to perform audio replaying with higher sound quality.

In this example, it is possible to curb an increase in processing amount of rendering processing performed multiple times as much as possible by switching (selecting) the speaker layout for each replaying band as a target of the rendering processing in accordance with components of main frequency bands of the object signals, for example. In other words, it is possible to omit the rendering processing for the replaying bands that do not require it and to reduce the processing amount.

Fifth Embodiment

<Configuration Example of Audio Replaying System>

Incidentally, a method called base management, bass management, or the like may be used by adding sub-woofers to enhance the low-frequency band at the time of audio replaying.

In base management, low-frequency band component signals are extracted through filtering processing from the replaying signals of main speakers, and the extracted signals are routed to one or more sub-woofers. In other words, replaying of the low-frequency components is performed by one sub-woofer or a plurality of sub-woofers.

However, since all the sub-woofers typically replay the same low-frequency band components in a case where a plurality of sub-woofers are used, for example, a sense of localization of the object is lost.

Also, in order to avoid such a decrease in a sense of localization, it is also possible to choose which of the low-frequency components of the main speakers is to be routed to each sub-woofer and to make arrangement such that the sub-woofers replaying the low-frequency components change in accordance with the localization direction of the object. Incidentally, behaviors such as routing in the entire system depend on design in such a case, and the design may become complicated and difficult.

On the other hand, according to the present technology, the rendering processing is performed for each of the plurality of replaying bands, and the content is replayed in the speaker layout for each of the replaying bands, and it is thus possible to realize base management capable of curbing a decrease in a sense of localization of the object without any need to employ complicated design.

Furthermore, there may be a case where an audio signal for a low frequency effect (LFE) channel for sub-woofers (hereinafter, also referred to as an LFE channel signal) is prepared in advance. In such a case, it is only necessary to appropriately perform again adjustment of the LFE channel signal and to add it to the speaker replaying signals of the sub-woofers according to the present technology.

Figure 11:
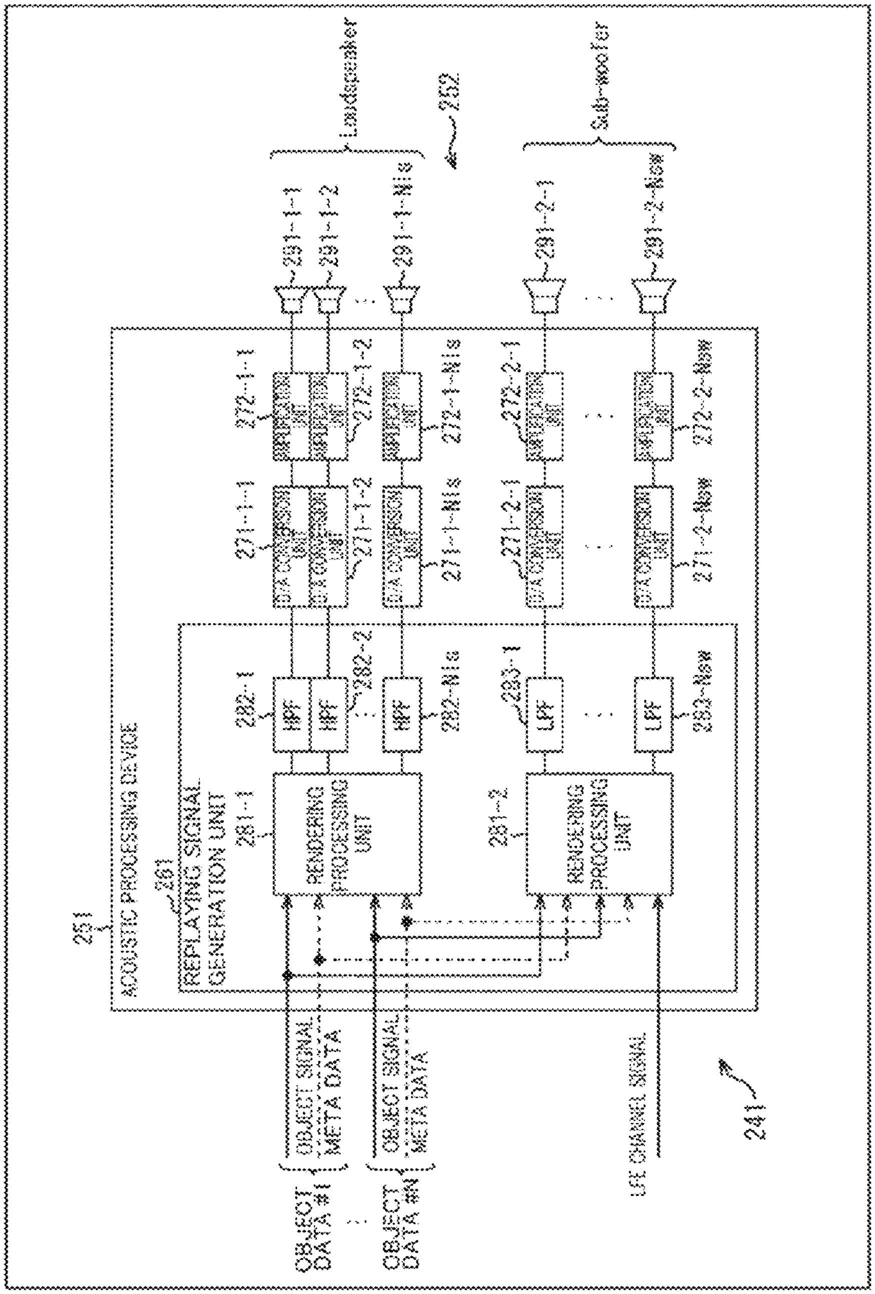
FIG. 11 is a diagram illustrating a configuration example of an audio replaying system.

In such a case where the LFE channel signal is prepared in advance in the content and base management is also performed, the audio replaying system is as illustrated in FIG. 11, for example.

An audio replaying system 241 illustrated in FIG. 11 includes an acoustic processing device 251 and a speaker system 252 and replays object-based audio content on the basis of supplied object data.

Data of the content in this example includes object data of N objects and a channel-based LFE channel signal. In this case, since the LFE channel signal is a channel-based audio signal, the meta data including position information and the like is not supplied. Also, the number N of objects can be an arbitrary number.

The acoustic processing device 251 includes a replaying signal generation unit 261, D/A conversion units 271-1-1 to 271-2-Nsw, and amplification units 272-1-1 to 272-2-Nsw.

Also, the replaying signal generation unit 261 includes a rendering processing unit 281-1, a rendering processing unit 281-2, HPFs 282-1 to 282-Nls, and LPFs 283-1 to 283-Nsw.

The speaker system 252 includes speakers 291-1-1 to 291-1-Nls and speakers 291-2-1 to 291-2-Nsw which have mutually different replaying bands.

The speakers 291-1-1 to 291-1-Nls will also simply be referred to as speakers 291-1 in a case where it is not particularly necessary to distinguish the speakers 291-1-1 to 291-1-Nls, and the speakers 291-2-1 to 291-2-Nsw will also simply be referred to as speakers 291-2 in a case where it is not necessary to distinguish the speakers 291-2-1 to 291-2-Nsw below.

Also, in a case where it is not necessary to particularly distinguish the speakers 291-1 and the speakers 291-2, the speakers 291-1 and the speakers 291-2 will also simply be referred to as speakers 291 below.

In this example, the Nls speakers 291-1 constituting the speaker system 252 are speakers having, as a replaying band, a band that is broad mainly from a relatively low band to a high band (broad band) and called loudspeakers for a broad band. In the speaker system 252, the Nls speakers 291-1 form one speaker layout for the broad band.

Also, Nsw speakers 291-2 constituting the speaker system 252 are speakers having a low-frequency replaying band of equal to or less than about 100 Hz, for example, and called sub-woofers for emphasizing the low-frequency band. In the speaker system 252, the Nsw speakers 291-2 form one speaker layout for the low-frequency band.

Object data of N objects constituting the content is supplied to the rendering processing unit 281-1 and the rendering processing unit 281-2.

The rendering processing unit 281-1 and the rendering processing unit 281-2 perform rendering processing such as VBAP on the basis of the object signal and the meta data constituting the supplied object data. In other words, the rendering processing unit 281-1 and the rendering processing unit 281-2 perform processing that is similar to that in the case of the rendering processing unit 41.

For example, the rendering processing unit 281-1 generates each of the speaker replaying signals output to the speakers 291-1-1 to 291-1-Nls as output destinations for each object. Then, the speaker replaying signals for each object generated for the same speakers 291-1 are added, and a final speaker replaying signal is thereby obtained.

In a case where VBAP is performed as the rendering processing, in particular, the rendering processing unit 281-1 uses a mesh formed by the Nls speakers 291-1.

The rendering processing unit 281-1 supplies the final speaker replaying signals generated for the speakers 291-1-1 to 291-1-Nls to the HPFs 282-1 to 282-Nls.

The rendering processing unit 281-2 also generates speaker replaying signals for the speakers 291-2 output to the speakers 291-2-1 to 291-2-Nsw as final output destinations similarly to the rendering processing unit 281-1. In a case where VBAP is performed as the rendering processing, in particular, the rendering processing unit 281-2 uses a mesh formed by the Nsw speakers 291-2.

Additionally, the LFE channel signal is supplied to the rendering processing unit 281-2.

Since the LFE channel signal typically does not have localization information (position information), the rendering processing unit 281-2 applies a specific coefficient and provides the outputs such that the LFE channel signal is distributed to all the speakers 291-2 instead of the rendering processing such as VBAP.

In other words, the rendering processing unit 281-2 adds a signal obtained by performing gain adjustment on the LFE channel signal with a predetermined coefficient to the speaker replaying signals corresponding to the speakers 291-2 obtained through the rendering processing and obtains the final speaker replaying signals, for each speaker 291-2. At this time, the coefficient used for the gain adjustment can be $(1/Nsw)^{1/2}$, for example.

The rendering processing unit 281-2 supplies the final speaker replaying signals generated for the speakers 291-2-1 to 291-2-Nsw to the LPFs 283-1 to 283-Nsw.

In a case where it is not particularly necessary to distinguish the rendering processing unit 281-1 and the rendering processing unit 281-2, the rendering processing unit 281-1 and the rendering processing unit 281-2 will also simply be referred to as rendering processing units 281 below.

The HPFs 282-1 to 282-Nls are HPFs that allow at least frequency components in a frequency band including the replaying band of the speakers 291-1, that is, a relatively broad predetermined frequency band to pass therethrough.

The HPFs 282-1 to 282-Nls perform filtering processing on the speaker replaying signals supplied from the rendering processing unit 281-1 and supply the speaker replaying signals including frequency components in the predetermined frequency band obtained as a result to the D/A conversion units 271-1-1 to 271-1-Nls.

Note that the HPFs 282-1 to 282-Nls will also simply be referred to as HPFs 282 below in a case where it is not particularly necessary to distinguish the HPFs 282-1 to 282-Nls. The HPFs 282 also function as the band restriction processing unit that performs band restriction processing in accordance with the replaying band that the speakers 291-1 have, similarly to the HPFs 42 illustrated in FIG. 2.

The LPFs 283-1 to 283-Nsw are LPFs that allow at least frequency components in a frequency band including the replaying band of the speakers 291-2, that is, a frequency band of equal to or less than about 100 Hz, for example, to pass therethrough.

The LPFs 283-1 to 283-Nsw perform filtering processing on the speaker replaying signals supplied from the rendering processing unit 281-2 and supply the speaker replaying signals including the frequency components in the low frequency band obtained as a result to the D/A conversion units 271-2-1 to 271-2-Nsw.

Note that in a case where it is not particularly necessary to distinguish the LPFs 283-1 to 283-Nsw, the LPFs 283-1 to 283-Nsw will also simply be referred to as LPFs 283 below. The LPFs 283 also function as the band restriction processing unit that performs band restriction processing in accordance with the replaying band that the speakers 291-2 have, similarly to the LPFs 44 illustrated in FIG. 2.

The D/A conversion units 271-1-1 to 271-1-Nls perform D/A conversion on the speaker replaying signals supplied from the HPFs 282-1 to 282-Nls and supply analog speaker replaying signals obtained as a result to the amplification units 272-1-1 to 272-1-Nls.

In a case where it is not particularly necessary to distinguish the D/A conversion units 271-1-1 to 271-1-Nls, the D/A conversion units 271-1-1 to 271-1-Nls will also simply be referred to as D/A conversion units 271-1 below.

The D/A conversion units 271-2-1 to 271-2-Nsw perform D/A conversion on the speaker replaying signals supplied from the LPFs 283-1 to 283-Nsw and supply analog speaker replaying signals obtained as a result to the amplification units 272-2-1 to 272-2-Nsw.

In a case where it is not particularly necessary to distinguish the D/A conversion units 271-2-1 to 271-2-Nsw, the D/A conversion units 271-2-1 to 271-2-Nsw will also simply be referred to as D/A conversion units 271-2 below. Also, in a case where it is not particularly necessary to distinguish the D/A conversion units 271-1 and the D/A conversion units 271-2, the D/A conversion units 271-1 and the D/A conversion units 271-2 will also simply be referred to as D/A conversion units 271 below.

The amplification units 272-1-1 to 272-1-Nls amplify the speaker replaying signals supplied from the D/A conversion units 271-1-1 to 271-1-Nls and supplies the speaker replaying signals to the speaker 291-1-1 to 291-1-Nls.

The amplification units 272-2-1 to 272-2-Nsw amplify the speaker replaying signals supplied from the D/A conversion units 271-2-1 to 271-2-Nsw and supply the speaker replaying signals to the speakers 291-2-1 to 291-2-Nsw.

Note that the amplification units 272-1-1 to 272-1-Nls will also simply be referred to as amplification units 272-1 in a case where it is not necessary to distinguish the amplification units 272-1-1 to 272-1-Nls, and the amplification units 272-2-1 to 272-2-Nsw will also simply be referred to as amplification units 272-2 in a case where it is not particularly necessary to distinguish the amplification units 272-2-1 to 272-2-Nsw below.

Also, in a case where it is not particularly necessary to distinguish the amplification units 272-1 and the amplification units 272-2, the amplification units 272-1 and the amplification units 272-2 will also simply be referred to as amplification units 272 below.

The speakers 291-1-1 to 291-1-Nls output sound on the basis of the speaker replaying signals supplied from the amplification units 272-1-1 to 272-1-Nls.

The speakers 291-2-1 to 291-2-Nsw output sound on the basis of the speaker replaying signals supplied from the amplification units 272-2-1 to 272-2-Nsw.

In this manner, the speaker system 252 is configured of the plurality of speakers 291 having mutually different replaying bands. In other words, the plurality of speakers 291 having mutually different replaying bands are arranged together in the surroundings of the listener who listens to the content.

Note that the example in which the speaker system 252 is provided separately from the acoustic processing device 251 is described here, a configuration in which the speaker system 252 is provided in the acoustic processing device 251 may also be employed.

Figure 12:
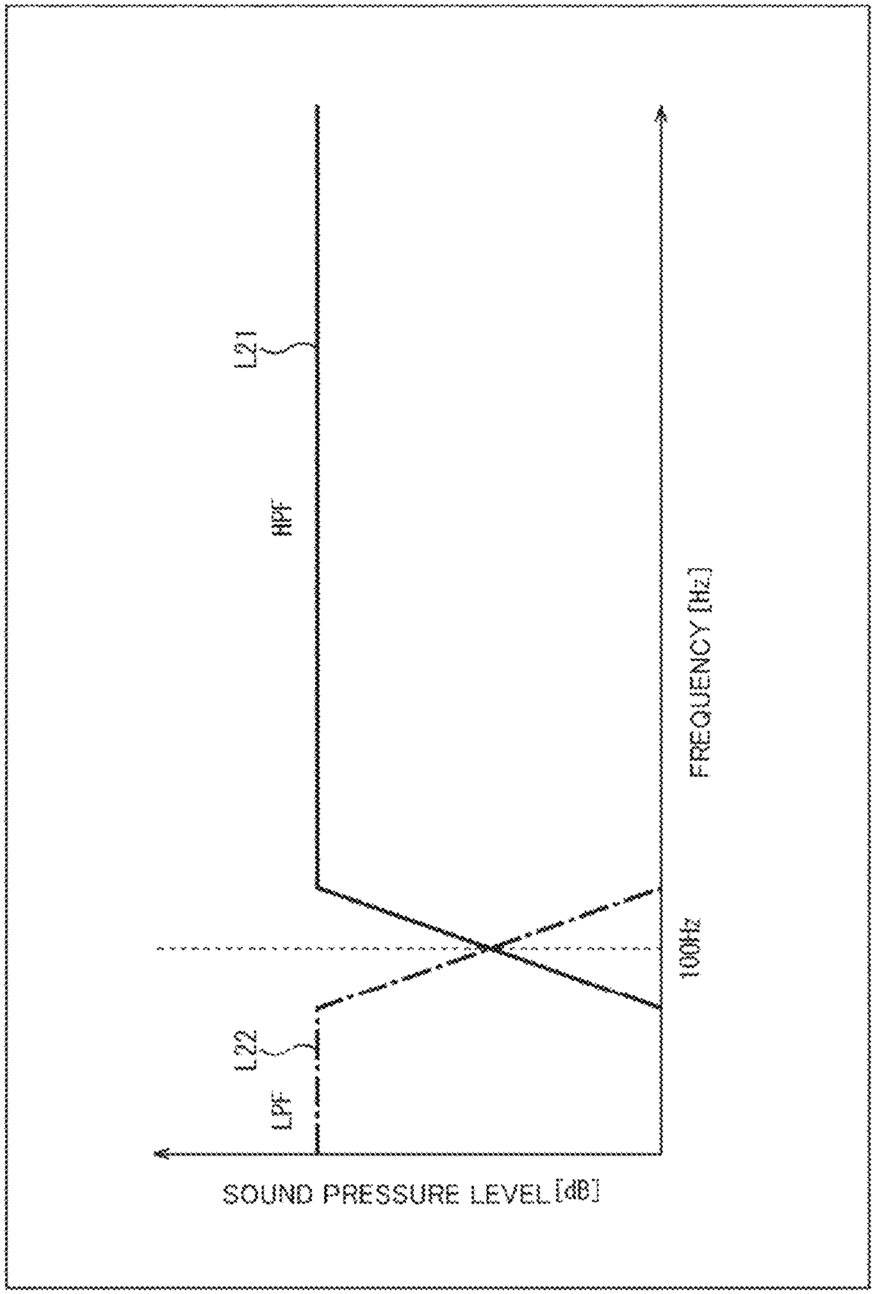
FIG. 12 is a diagram illustrating frequency property examples of HPF and LPF.

Also, frequency properties, that is, the restriction bands (passing bands) of the HPFs 282 and the LPFs 283 functioning as the band restriction processing units are as illustrated in FIG. 12, for example. Note that the horizontal axis represents a frequency (Hz) while the vertical axis represents a sound pressure level (dB) in FIG. 12.

In FIG. 12, the polygonal line L21 represents the frequency property of the HPFs 282, and the polygonal line L22 represents the frequency property of the LPFs 283.

As can be known from the polygonal line L21, the HPFs 282 perform high-frequency band passing filtering in which components in the frequency band that is higher than that of the LPFs 283, that is, a broad frequency band that is equal to or greater than about 100 Hz are allowed to pass therethrough. On the other hand, as can be understood from the polygonal line L22, the LPFs 283 perform low-frequency band passing filtering in which components in the frequency band that is lower than that of the HPFs 282, that is, at low frequencies of equal to or less than about 100 Hz are allowed to pass therethrough. Although the passing bands of the HPFs 282 and the LPFs 283 cross over each other in this case, the passing bands of the HPFs 282 and the LPFs 283 may not cross over each other.

Note that although the Nls HPFs 282 have the same property (frequency property) in the audio replaying system 241, the Nls HPFs 282 may be filters (HPFs) having mutually different properties. In addition, the HPFs 282 may not be provided between the rendering processing unit 281-1 and the speakers 291-1.

Similarly, although the Nsw LPFs 283 have the same property (frequency property), the LPFs 283 may have mutually different properties, and the LPFs 283 may not be provided between the rendering processing unit 281-2 and the speakers 291-2.

<Explanation of Replaying Processing>

Figure 13:
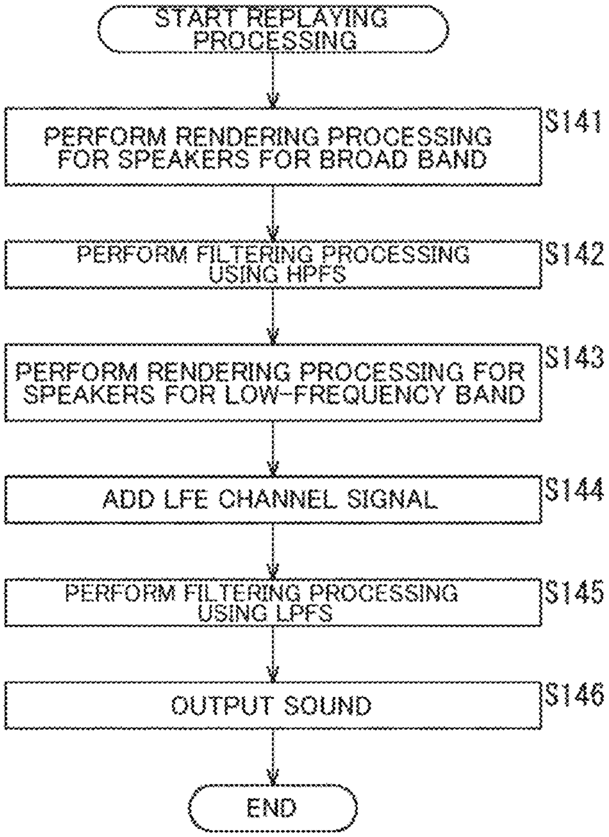
FIG. 13 is a flowchart for explaining replaying processing.

Next, the replaying processing performed by the audio replaying system 241 will be described with reference to the flowchart in FIG. 13.

In Step S141, the rendering processing unit 281-1 performs rendering processing for the speakers 291-1 for the broad band on the basis of the supplied N pieces of object data and supplies speaker replaying signals obtained as a result to the HPFs 282. In Step S141, processing that is similar to that in Step S11 in FIG. 4 is performed.

In Step S142, the HPFs 282 perform filtering processing (band restriction processing) using the HPFs on the speaker replaying signals supplied from the rendering processing unit 281-1.

The HPFs 282 supplies the speaker replaying signals after the band restriction obtained through the filtering processing to the speakers 291-1 via the D/A conversion units 271-1 and the amplification units 272-1.

In Step S143, the rendering processing unit 281-2 performs rendering processing for the speakers 291-2 for the low-frequency band on the basis of the supplied N pieces of object data. In Step S143, for example, processing that is similar to that in Step S15 in FIG. 4 is performed.

In Step S144, the rendering processing unit 281-2 performs gain adjustment of a supplied LFE channel signal with a predetermined coefficient, adds it to the speaker replaying signals, and supplies the final speaker replaying signals obtained as a result to the LPFs 283.

In Step S145, the LPFs 283 perform filtering processing (band restriction processing) using the LPFs on the speaker replaying signals supplied from the rendering processing unit 281-2.

The LPFs 283 supply the speaker replaying signals after the band restriction obtained through the filtering processing to the speakers 291-2 via the D/A conversion units 271-2 and the amplification units 272-2.

In the acoustic processing device 251, base management is realized through the processing in Step S143 and Step S144.

Since the rendering processing unit 281-2 performs the rendering processing for the low-frequency band in this example, in particular, it is possible to simply curb degradation of a sense of localization of the object without any need of complicated design.

In Step S146, all the speakers 291 constituting the speaker system 252 output sound on the basis of the speaker replaying signals supplied from the amplification units 272, and the replaying processing ends.

As described above, the audio replaying system 241 performs rendering processing for each of the replaying bands that the speakers 291 have, that is, for each of speaker layouts of the plurality of replaying bands, performs gain adjustment of the LFE channel signal, and adds it to the speaker replaying signals in the low-frequency band.

In this manner, optimal rendering in accordance with the meta data of the object is realized in the audio replaying system 241 even in a case where the low-frequency band is emphasized by using a plurality of sub-woofers (speakers 291-2). It is thus possible to curb degradation of sound quality due to the replaying bands of the speakers 291, to easily curb a decrease in a sense of localization of the object without any need to employ complicated design, and to perform audio replaying with higher sound quality.

<Configuration Example of Computer>

Incidentally, the aforementioned series of processes can also be performed by hardware or software. In the case where the series of processes is executed by software, a program that configures the software is installed on a computer. Here, the computer includes a computer built in dedicated hardware, a general-purpose personal computer, for example, on which various programs are installed to be able to execute various functions, and the like.

Figure 14:
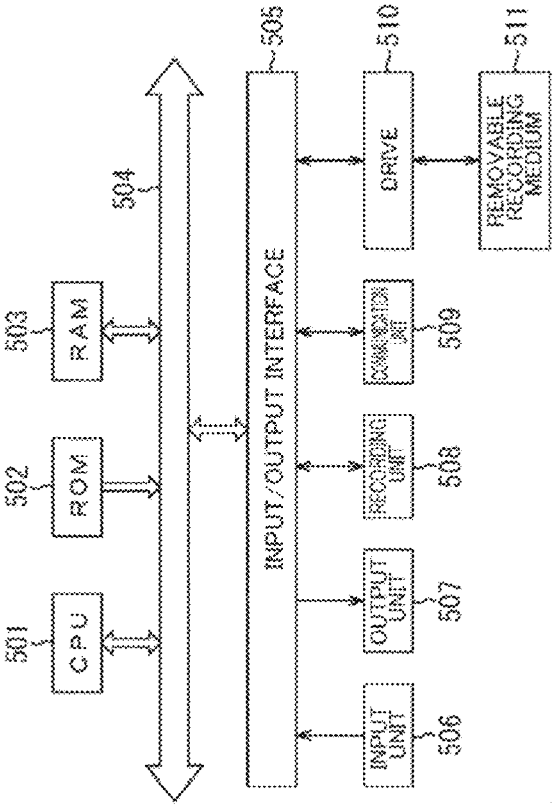
FIG. 14 is a diagram showing a configuration example of a computer.

FIG. 14 is a block diagram illustrating a configuration example of hardware of the computer that executes the aforementioned series of processes using the program.

In the computer, a central processing unit (CPU) 501, a read only memory (ROM) 502, and a random access memory (RAM) 503 are connected to each other by a bus 504.

An input/output interface 505 is further connected to the bus 504. An input unit 506, an output unit 507, a recording unit 508, a communication unit 509, and a drive 510 are connected to the input/output interface 505.

The input unit 506 is a keyboard, a mouse, a microphone, an imaging element, or the like. The output unit 507 is a display, a speaker, or the like. The recording unit 508 is a hard disk, a nonvolatile memory, or the like. The communication unit 509 is a network interface or the like. The drive 510 drives a removable recording medium 511 such as a magnetic disk, an optical disc, a magneto-optical disk, or a semiconductor memory.

In the computer that has the aforementioned configuration, the aforementioned series of processes are executed by the CPU 501 loading the program recorded in the recording unit 508, for example, in the RAM 503 via the input/output interface 505 and the bus 504 and executing the program.

The program executed by the computer (the CPU 501) can be recorded and provided in, for example, the removable recording medium 511 serving as a package medium for supply. Also, the program can be provided via a wired or wireless transfer medium such as a local area network, the Internet, or digital satellite broadcasting.

In the computer, it is possible to install the program in the recording unit 508 via the input/output interface 505 by mounting the removable recording medium 511 on the drive 510. Furthermore, the program can be received by the communication unit 509 via a wired or wireless transfer medium and can be installed in the recording unit 508. Alternatively, the program can be installed in advance in the ROM 502 or the recording unit 508.

Note that the program executed by a computer may be a program that performs processing chronologically in the order described in the present specification or may be a program that performs processing in parallel or at a necessary timing such as a called time.

Embodiments of the present technology are not limited to the above-described embodiments and can be changed variously within the scope of the present technology without departing from the gist of the present technology.

For example, the present technology may be configured as cloud computing in which a plurality of devices share and cooperatively process one function via a network.

In addition, each step described in the above flowchart can be executed by one device or executed in a shared manner by a plurality of devices.

Furthermore, in a case in which one step includes a plurality of processes, the plurality of processes included in the one step can be executed by one device or executed in a shared manner by a plurality of devices.

Furthermore, the present technology can be configured as follows.

(1) An acoustic processing device including:

a first rendering processing unit that performs rendering processing on the basis of an audio signal and generates a first output audio signal for outputting sound from a plurality of first speakers; and a second rendering processing unit that performs rendering processing on the basis of the audio signal and generates a second output audio signal for outputting sound from a plurality of second speakers having a different replaying band from that of the first speakers.

(2) The acoustic processing device according to (1), further including:

a first band restriction processing unit that performs band restriction processing in accordance with the replaying band of the first speakers on the first output audio signal; and a second band restriction processing unit that performs band restriction processing in accordance with the replaying band of the second speakers on the second output audio signal.

(3) The acoustic processing device according to (2), further including:

a third band restriction processing unit that performs band restriction processing in accordance with the replaying band of the first speakers on the audio signal;

a third rendering processing unit that performs rendering processing on the basis of a first band restriction signal obtained through the band restriction processing performed by the third band restriction processing unit and generates a third output audio signal for outputting sound from the plurality of first speakers;

a fourth band restriction processing unit that performs band restriction processing in accordance with a replaying band of the second speakers on the audio signal;

a fourth rendering processing unit that performs rendering processing on the basis of a second band restriction signal obtained through the band restriction processing performed by the fourth band restriction processing unit and generates a fourth output audio signal for outputting sound from the plurality of second speakers; and a selection unit that selects either causing the third band restriction processing unit and the fourth band restriction processing unit to perform the band restriction processing and causing the third rendering processing unit and the fourth rendering processing unit to perform the rendering processing or causing the first rendering processing unit and the second rendering processing unit to perform the rendering processing and causing the first band restriction processing unit and the second band restriction processing unit to perform the band restriction processing.

(4) The acoustic processing device according to (3), in which the selection unit performs the selection on the basis of the number of audio signals and the total number of the first speakers and the second speakers.

(5) The acoustic processing device according to (1), further including:

a first band restriction processing unit that performs band restriction processing in accordance with the replaying band of the first speakers on the audio signal; and a second band restriction processing unit that performs band restriction processing in accordance with the replaying band of the second speakers on the audio signal, in which the first rendering processing unit performs the rendering processing on the basis of a first band restriction signal obtained through the band restriction processing performed by the first band restriction processing unit, and the second rendering processing unit performs the rendering processing on the basis of a second band restriction signal obtained through the band restriction processing performed by the second band restriction processing unit.

(6) The acoustic processing device according to (1), (2), or (5), further including:

a determination unit that determines, for each of the audio signals, whether the rendering processing based on the audio signal is to be performed by the first rendering processing unit, or by the second rendering processing unit, or by both the first rendering processing unit and the second rendering processing unit, on the basis of at least any one of the audio signal and information regarding the audio signal.

(7) The acoustic processing device according to (6), in which the determination unit performs the determination on the basis of a frequency property of the audio signal.

(8) The acoustic processing device according to (6) or (7), in which the determination unit performs the determination on the basis of information indicating a sound source type of the audio signal.

(9) The acoustic processing device according to any one of (1) to (8), in which the audio signal is an object signal of an audio object, and the first rendering processing unit and the second rendering processing unit perform the rendering processing on the basis of the audio signal and meta data of the audio signal.

(10) The acoustic processing device according to (9), in which the meta data includes position information indicating a position of the audio object.

(11) The acoustic processing device according to (10), in which the position information is information indicating a relative position of the audio object with reference to a predetermined listening position.

(12) The acoustic processing device according to any one of (9) to (11), in which the second rendering processing unit adds the second output audio signal obtained through the rendering processing and a channel-based audio signal and obtains the final second output audio signal.

(13) The acoustic processing device according to (12), in which the channel-based audio signal is an audio signal of an LFE channel.

(14) The acoustic processing device according to any one of (1) to (13), in which the first rendering processing unit and the second rendering processing unit perform processing using VBAP as the rendering processing.

(15) The acoustic processing device according to any one of (1) to (14), further including:

the plurality of first speakers; and the plurality of second speakers.

(16) An acoustic processing method including, by an acoustic processing device:

performing rendering processing on the basis of an audio signal and generating a first output audio signal for outputting sound from a plurality of first speakers; and performing rendering processing on the basis of the audio signal and generating a second output audio signal for outputting sound from a plurality of second speakers having a different replaying band from that of the first speakers.

(17) A program that causes a computer to execute processing including steps of;

performing rendering processing on the basis of an audio signal and generating a first output audio signal for outputting sound from a plurality of first speakers; and performing rendering processing on the basis of the audio signal and generating a second output audio signal for outputting sound from a plurality of second speakers having a different replaying band from that of the first speakers.

REFERENCE SIGNS LIST

11 Audio replaying system
21 Acoustic processing device
22 Speaker system
41-1 to 41-3, 41 Rendering processing unit
42-1 to 42-Nt, 42 HPF
43-1 to 43-Ns, 43 BPF
44-1 to 44-Nw, 44 LPF
151 Selection unit
211 Determination unit

The invention claimed is:

1. An acoustic processing device comprising:

a first rendering processing unit that performs rendering processing on the basis of an audio signal and generates a first output audio signal for outputting sound from a plurality of first speakers; and a first band restriction processing unit that performs band restriction processing in accordance with the replaying band of the first speakers on the first output audio signal; and a second rendering processing unit that performs rendering processing on the basis of the audio signal and generates a second output audio signal for outputting sound from a plurality of second speakers having a different replaying band from that of the first speakers; and a second band restriction processing unit that performs band restriction processing in accordance with the replaying band of the second speakers on the second output audio signal wherein the second band restriction processing unit performs filtering processing using a band pass filter (BPF).

2. The acoustic processing device according to claim 1, further comprising:

a third band restriction processing unit that performs band restriction processing in accordance with the replaying band of the first speakers on the audio signal;

a third rendering processing unit that performs rendering processing on the basis of a first band restriction signal obtained through the band restriction processing performed by the third band restriction processing unit and generates a third output audio signal for outputting sound from the plurality of first speakers;

a fourth band restriction processing unit that performs band restriction processing in accordance with a replaying band of the second speakers on the audio signal;

a fourth rendering processing unit that performs rendering processing on the basis of a second band restriction signal obtained through the band restriction processing performed by the fourth band restriction processing unit and generates a fourth output audio signal for outputting sound from the plurality of second speakers; and a selection unit that selects either causing the third band restriction processing unit and the fourth band restriction processing unit to perform the band restriction processing and causing the third rendering processing unit and the fourth rendering processing unit to perform the rendering processing or causing the first rendering processing unit and the second rendering processing unit to perform the rendering processing and causing the first band restriction processing unit and the second band restriction processing unit to perform the band restriction processing.

3. The acoustic processing device according to claim 2, wherein the selection unit performs the selection on the basis of a number of audio signals and a total number of the first speakers and the second speakers.

4. The acoustic processing device according to claim 1, further comprising:

a first band restriction processing unit that performs band restriction processing in accordance with the replaying band of the first speakers on the audio signal; and a second band restriction processing unit that performs band restriction processing in accordance with the replaying band of the second speakers on the audio signal, wherein the first rendering processing unit performs the rendering processing on the basis of a first band restriction signal obtained through the band restriction processing performed by the first band restriction processing unit, and the second rendering processing unit performs the rendering processing on the basis of a second band restriction signal obtained through the band restriction processing performed by the second band restriction processing unit.

5. The acoustic processing device according to claim 1, further comprising: a determination unit that determines, for each of the number of audio signals, whether the rendering processing based on the audio signal is to be performed by the first rendering processing unit, or by the second rendering processing unit, or by both the first rendering processing unit and the second rendering processing unit, on the basis of at least any one of the audio signal and information regarding the audio signal.

6. The acoustic processing device according to claim 5, wherein the determination unit performs the determination on the basis of a frequency property of the audio signal.

7. The acoustic processing device according to claim 5, wherein the determination unit performs the determination on the basis of information indicating a sound source type of the audio signal.

8. The acoustic processing device according to claim 1, wherein the audio signal is an object signal of an audio object, and the first rendering processing unit and the second rendering processing unit perform the rendering processing on the basis of the audio signal and meta data of the audio signal.

9. The acoustic processing device according to claim 8, wherein the meta data includes position information indicating a position of the audio object.

10. The acoustic processing device according to claim 9, wherein the position information is information indicating a relative position of the audio object with reference to a predetermined listening position.

11. The acoustic processing device according to claim 8, wherein the second rendering processing unit adds the second output audio signal obtained through the rendering processing and a channel-based audio signal and obtains a final second output audio signal.

12. The acoustic processing device according to claim 11, wherein the channel-based audio signal is an audio signal of a low frequency effect (LFE) channel.

13. The acoustic processing device according to claim 1, wherein the first rendering processing unit and the second rendering processing unit perform processing using vector based amplitude panning (VBAP) as the rendering processing.

14. The acoustic processing device according to claim 1, further comprising: the plurality of first speakers; and the plurality of second speakers.

15. An acoustic processing method comprising, by an acoustic processing device:

performing rendering processing on the basis of an audio signal and generating a first output audio signal for outputting sound from a plurality of first speakers; and performing band restriction processing via a first band restriction processing unit in accordance with the replaying band of the first speakers on the first output audio signal; and performing rendering processing on the basis of the audio signal and generating a second output audio signal for outputting sound from a plurality of second speakers having a different replaying band from that of the first speakers; and performing band restriction processing via a second band restriction processing unit in accordance with the replaying band of the second speakers on the second output audio signal wherein the second band restriction processing unit performs filtering processing using a band pass filter (BPF).

16. A non-transitory computer readable medium configured to execute processing of:

performing rendering processing on the basis of an audio signal and generating a first output audio signal for outputting sound from a plurality of first speakers; and performing band restriction processing via a first band restriction processing unit in accordance with the replaying band of the first speakers on the first output audio signal; and performing rendering processing on the basis of the audio signal and generating a second output audio signal for outputting sound from a plurality of second speakers having a different replaying band from that of the first speakers; and performing band restriction processing via a second band restriction processing unit in accordance with the replaying band of the second speakers on the second output audio signal wherein the second band restriction processing unit performs filtering processing using a band pass filter (BPF).

* * * * *